United States Patent
Filgueiras et al.

(10) Patent No.: US 10,231,283 B2
(45) Date of Patent: Mar. 12, 2019

(54) ROAMING GROUPS IN A PEER-TO-PEER NETWORK

(75) Inventors: Henrique Filgueiras, Kirkland, WA (US); Mukund Sankaranarayan, Sammamish, WA (US); Amer A. Hassan, Kirkland, WA (US); Mitesh K. Desai, Redmond, WA (US); Mahmoud S. Elhaddad, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 13/047,583

(22) Filed: Mar. 14, 2011

(65) Prior Publication Data
US 2012/0239755 A1    Sep. 20, 2012

(51) Int. Cl.
*H04W 84/18*    (2009.01)
*H04L 12/40*    (2006.01)
*H04L 29/08*    (2006.01)
*H04W 76/40*    (2018.01)
*H04W 4/08*    (2009.01)

(52) U.S. Cl.
CPC ........ *H04W 76/40* (2018.02); *H04L 12/40123* (2013.01); *H04L 67/104* (2013.01); *H04W 84/18* (2013.01); *H04W 4/08* (2013.01)

(58) Field of Classification Search
USPC .................................................. 709/206
See application file for complete search history.

(56) References Cited

U.S. PATENT DOCUMENTS

| 6,182,212 | B1 |   | 1/2001  | Atkins |
|-----------|----|---|---------|--------|
| 7,346,344 | B2 |   | 3/2008  | Fontaine |
| 7,466,810 | B1 | * | 12/2008 | Quon et al. ............. 379/201.01 |
| 7,523,122 | B2 |   | 4/2009  | Vasu |
| 7,752,329 | B1 |   | 7/2010  | Meenan |
| 8,228,861 | B1 | * | 7/2012  | Nix .............................. 370/329 |
| 8,369,845 | B2 | * | 2/2013  | Zou et al. .................... 455/419 |

(Continued)

FOREIGN PATENT DOCUMENTS

| CN | 1841396   | A | 10/2006 |
|----|-----------|---|---------|
| CN | 101044735 | A | 9/2007  |

(Continued)

OTHER PUBLICATIONS

Managing your Roaming Profile—Published Date: May 19, 2004.

(Continued)

*Primary Examiner* — Shirley X Zhang

(57) ABSTRACT

A computing device that forms a group in accordance with a peer-to-peer protocol in which a device may be identified based on a credential of a user. The credential may be used to determine a unique identifier for the user such that the same identifier is used on any device operated by the same user. Such an identifier may be used in connection with a peer-to-peer protocol that supports persistent peer-to-peer groups. As a result, the unique identifier for the user may be retained by remote devices that have paired with any device operated by a particular user such that those remote devices may automatically establish a connection with any other device operated by the same user that similarly uses the same unique identifier for the user.

20 Claims, 9 Drawing Sheets

(56) References Cited

U.S. PATENT DOCUMENTS

| | | | |
|---|---|---|---|
| 8,432,904 B1* | 4/2013 | Eslambolchi | H04W 4/08 370/328 |
| 8,464,063 B2* | 6/2013 | Agarwal | H04L 63/10 709/224 |
| 2002/0037736 A1* | 3/2002 | Kawaguchi | H04W 4/08 455/518 |
| 2004/0210767 A1* | 10/2004 | Sinclair | H04L 29/06 726/6 |
| 2005/0048919 A1 | 3/2005 | Jeannerod | |
| 2006/0146767 A1* | 7/2006 | Moganti | 370/338 |
| 2007/0086435 A1* | 4/2007 | Kaler | H04L 67/104 370/352 |
| 2008/0208908 A1 | 8/2008 | Kashyap | |
| 2008/0293411 A1* | 11/2008 | Hinton et al. | 455/435.1 |
| 2009/0170511 A1* | 7/2009 | Takei | 455/435.1 |
| 2009/0177790 A1* | 7/2009 | McNeil | H04L 67/104 709/229 |
| 2009/0310165 A1 | 12/2009 | Olsson | |
| 2010/0011108 A1* | 1/2010 | Clark | H04W 76/002 709/227 |
| 2010/0015968 A1* | 1/2010 | Moriwaki et al. | 455/422.1 |
| 2010/0130176 A1* | 5/2010 | Wan et al. | 455/414.1 |
| 2010/0190491 A1* | 7/2010 | Castrogiovanni et al. | 455/426.1 |
| 2010/0329209 A1* | 12/2010 | Akselsen | 370/331 |
| 2010/0333019 A1* | 12/2010 | Oschwald | G06Q 30/02 715/810 |
| 2011/0045851 A1* | 2/2011 | Maddox | H04W 4/06 455/466 |
| 2011/0286343 A1* | 11/2011 | Powell et al. | 370/252 |
| 2011/0289433 A1* | 11/2011 | Whalin | G06F 17/30964 715/753 |
| 2012/0023265 A1* | 1/2012 | Liao | G06F 13/387 710/5 |
| 2012/0084364 A1* | 4/2012 | Sivavakeesar | 709/205 |
| 2012/0179764 A1* | 7/2012 | Erdal | G06Q 50/01 709/206 |
| 2013/0007231 A1* | 1/2013 | Forssell | 709/221 |
| 2013/0024901 A1* | 1/2013 | Sharif-Ahmadi et al. | 725/114 |

FOREIGN PATENT DOCUMENTS

| | | |
|---|---|---|
| CN | 101164058 A | 4/2008 |
| CN | 101218784 A | 7/2008 |
| CN | 101667996 A | 3/2010 |
| CN | 101874418 A | 10/2010 |

OTHER PUBLICATIONS

"First Office Action and Search Report Issued in Chinese Patent Application No. 201210066406.0", dated Apr. 1, 2016, 19 Pages.

"Second Office Action Issued in Chinese Patent Application No. 201210066406.0", dated Nov. 2, 2016, 16 Pages.

"Third Office Action and Search Report Issued in Chinese Patent Application No. 201210066406.0", dated May 4, 2017, 22 Pages.

* cited by examiner

ROAMING GROUPS IN A PEER-TO-PEER NETWORK

BACKGROUND

Many computers today have radios to support wireless communication. Wireless communication is used, for example, to connect to an access point of a network. By associating with the access point, a wireless computer can access devices on the network or to other networks reachable through that network, such as the Internet. As a result, the wireless computer can exchange data with many other devices, enabling many useful functions.

To enable computers to be configured for association with an access point, it is common for the access points to operate according to a standard. A common standard for devices that connect to access points is called Wi-Fi. This standard was promulgated by the Wi-Fi Alliance, and is widely used in portable computers. There are multiple versions of this standard, but any of them can be used to support connections through access points.

Wireless communications may also be used to form connections directly to other devices without using an access point. These connections are sometimes called "peer-to-peer" connections and may be used, for example, to allow a computer to connect to a mouse or keyboard wirelessly. Wireless communications for these direct connections also have been standardized. A common standard for such wireless communications is called BLUETOOTH®.

In some instances, a wireless computer may concurrently connect to other devices through an access point and as part of a group engaging in peer-to-peer communications. To support such concurrent communication, some computers have multiple radios. More recently a standard has been proposed, called Wi-Fi Direct, that enables both an infrastructure connection and communication as part of a peer-to-peer group with similar wireless communications that can be processed with a single radio. This standard, also published by the Wi-Fi Alliance, extends the popular Wi-Fi communications standard for infrastructure-based communications to support direct connections.

Such direct connections may be formed among groups of devices. In accordance with the Wi-Fi Direct standard, devices that wish to communicate may exchange messages, formatted as action frames, to form a group. Initially forming a group may require user input, such as to enter a PIN or other information that serves to authorize devices to connect with one another. This process of forming an initial connection is sometimes called "pairing."

The Wi-Fi Direct standard includes a mechanism by which devices retain information about other devices with which they have paired. In this way, devices may form persistent groups such that the devices can communicate if a connection between the devices is interrupted. Such a disruption can happen, for example, if one device is turned off or the devices move out of communication range. When the connection between devices in a persistent group is broken, if those devices are later able to support a connection between them, the peer to peer group may automatically reform without user action. In accordance with the Wi-Fi Direct standard, groups, once formed, are identified by a hardware identifier of a device controlling the group. Because the hardware identifier will be persistent for the lifetime of a device and is included in beacons sent by a device available for formation of a group, other devices can identify "known" devices for which a group has already been formed. When it is possible to reestablish a connection with those devices, a group may be re-formed using stored information, without the need to repeat the pairing process.

SUMMARY

A peer-to-peer communication protocol, used by wireless devices to establish peer-to-peer groups, may incorporate a mechanism for a device that has paired with a device operated by a particular user to automatically identify and pair with a different device operated by the same user. Such a capability allows a user to have device connections available to the user when using one computer automatically translate when using a second computer.

In some embodiments, devices operated by the same user may be identified based an identifier unique to the user included in information exchanged between devices during pairing. Such an identifier may be retained as part of persistent device information retained for re-establishing connections. The identifier may be incorporated into messages exchanged between devices by replacing, based on the unique user identifier, a device identifier of that type that is exchanged between paired devices in accordance with a peer-to-peer protocol used in forming a peer-to-peer group. Alternatively or additionally, the unique user identifier may be incorporated by adding it as an information element in a message that is exchanged between paired devices in accordance with a peer-to-peer protocol used in forming a peer-to-peer group.

In some embodiments, an identifier unique of the user may be determined based on user input. That input may be a credential that identifies the user. Such a credential, for example, may be a log-on credential applicable to each of a plurality of computing devices that may be operated by a user or a user name for a service that may be accessed by a user from each of a plurality of computing devices.

The identifier unique to the user may be stored in connection with information used to re-establish a peer-to-peer group. It may be stored, for example, on any or all of the devices that are paired as part of a peer-to-peer group. Alternatively or additionally, it may be stored on a server that may be accessible to each of a plurality of computing devices operated by a user such that information about the group can be downloaded from the server from any computing device operated by the user.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
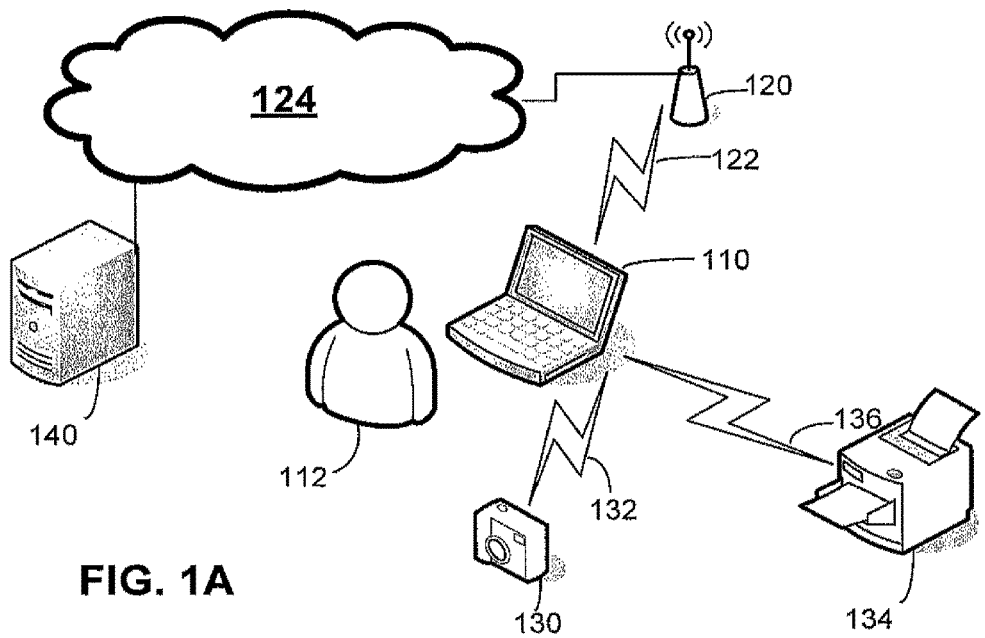
FIG. 1A is a sketch of an exemplary environment in which embodiments of the invention may be practiced, shown at a first time when a user is operating a first computing device.

The Inventors have recognized and appreciated that operation of wireless devices would be more useful to users of those wireless devices if peer-to-peer groups established while the user is operating one wireless device are automatically reestablished on other devices when operated by the same user. For example a user operating a laptop computer may establish connections, using a peer-to-peer protocol, with a printer or other wireless device. If that user later operates a smart phone in the vicinity of the printer, the user's experience may be greatly enhanced if a connection between the smart phone and the printer were automatically established based on the information already exchanged as part of pairing between the laptop and the printer. Such a capability would allow the user to print to the printer from the smart phone without repeating a pairing "ceremony."

In some embodiments, this capability may be established by migrating device connection profiles between different computing devices operated by the user and/or incorporating into messages exchanged as part of a peer-to-peer protocol a unique identifier of the user. The identifier of the user may be stored with the group profile when a persistent group is first established and later user to select and apply that profile when subsequent communications tagged with that identifier are detected, regardless of what device a user is operating at the time.

Such an identifier may appear in messages sent by any of multiple devices operated by a user. Other devices, with which a device operated by the user may pair, may record the identifier of the user as part of the information used to identify a device with which a connection has previously been established. For example, the identifier of the user may be communicated in such a way that a device receiving a message including that identifier records that identifier in a persistent device store used to identify devices in a persistent peer-to-peer group. A group may later be established in accordance with techniques of a peer-to-peer protocol that supports persistent groups with any device operated by the same user that similarly includes the identifier of the user.

An identifier of the user may be incorporated into a message in accordance with a peer-to-peer protocol in any suitable way. In some embodiments, each device operated by a user may be configured to insert the identifier of the user in one or more messages in place of a value that is conventionally determined in some other way in devices operating in accordance with a peer-to-peer protocol. For example, the identifier of the user may be inserted in messages in place of a hardware-based identifier of the device.

When the identifier of the user replaces a value used to identify a device that is part of a persistent group, devices that pair with a device operated by the user may have a conventional configuration but may nonetheless automatically establish a connection with any device operated by the user that uses the identifier of the user. For example, the identifier of the user may replace a device identifier that may otherwise be present in a message in accordance with the peer-to-peer protocol. In such embodiments, a device that pairs with a device operated by the user may store a persistent group profile associated with the identifier of the user. It may later automatically recognize any other device operated by that user as a known device and use the persistent group profile to establish a group with that device in accordance with a standard peer-to-peer protocol that supports persistent groups. Advantageously, the need for a further pairing ceremony, and specifically user actions during a pairing ceremony, may be eliminated by accessing information in a persistent device store.

Alternatively or additionally, the identifier of the user may be added as an additional element to a message formatted in accordance with a peer-to-peer protocol. In some embodiments, the identifier may be inserted as an information element in a message formatted in accordance with a peer-to-peer protocol. A device receiving that information element may record it in connection with a persistent group profile. When that device subsequently detects messages with the same identifier, the device may use the information in the persistent group profile.

A device operated by a user may determine what identifier of the user to add to messages in any suitable way. In some embodiments, the identifier may be determined directly from user input. That input may be either express or implied. As an example of express input, a user may enter a value for the identifier into a configuration dialog box presented by an operating system utility controlling peer-to-peer communications. As an example of an implied input, a utility may collect information about a user of a computing device from an external service that is accessed based on information a user has stored on the computing device. Accordingly, the specific techniques by which an identifier of a user is determined is not critical to the invention.

In illustrative embodiments described herein, the identifier of the user is determined from a credential supplied by a user. The specific type of credential also is not critical to the invention. In some embodiments, the credential may be a credential associated with the computing device. For example, the credential may be a user name input by a user when logging into a computing device. Such a log-on process may be performed using conventional techniques such that a utility controlling peer-to-peer communications may access that credential form conventional components of an operating system.

Alternatively, the user credential may be associated with another service either on a computing device operated by the user or an external service accessed over a network. For example, the assignee of the present application operates a service called LiveID in which users are given credentials that allow them access to many networked services. The identifier of the user may be derived from a user name or other information of the user associated with an external service such as LiveID.

Regardless of the source of the credential, the identifier of the user may be determined from the credential in any suitable way. The identifier, for example, may simply be the credential. Though, any suitable processing may alternatively or additionally be performed on the credential to generate the identifier. That processing may include selecting portions of the credential and, alternatively or additionally, may include cryptographic processing to obscure the identifier. Though, so long as the processing is deterministic, it may be performed on any of multiple devices operated by a user such that all arrive at the same identifier.

In embodiments in which group profiles representing devices with which a user-operated device have paired are migrated among multiple devices operated by the user, that migration may be performed in any suitable way. In some embodiments, the information may be stored directly copied by the user from one machine to another. Such copying may occur as part of a device synchronization process, transportation of a physical media between devices or transfer of information over a network, as is known in the art, or in any other suitable way. In other embodiments, the group profiles may be stored in a location accessible to multiple devices operated by the user. For example, the group profiles may be stored on a server or other networked computing device. In some embodiments, the server that stores the group profiles may be operated by the service associated with the credentials that allows the user to be identified.

The forgoing techniques may be used alone or together in any suitable combination in any suitable environment. FIG. 1A illustrates an environment in which a computing device communicates at a first time according to some embodiments.

In the example of FIG. 1A, computing device 110 is illustrated as a laptop computer. Though, it should be appreciated that the form factor of computing device 110 is not a limitation on the invention. Computing devices configured as tablets, SmartPhones or with any other suitable form factor may be configured and operated according to embodiments of the invention. Moreover, it should be appreciated that any wireless device may play any role in a peer-to-peer group. Accordingly, it is not a requirement that any of the devices in the group be a computing device.

FIG. 1A illustrates that computing device 110 is being operated by user 112. User 112 may interact with computing device 110 using techniques as are known in the art to control computing device 110 to wirelessly connect with other devices.

In this example, FIG. 1A illustrates peer-to-peer wireless connections. Computing device 110 is shown to have connections 132 and 136 to camera 130 and printer 134, respectively. In this case, camera 130 and printer 134 are examples of wireless devices with which computing device 110 may connect in order to exchange data with these devices.

Camera 130, printer 134 and computing device 110 may communicate over wireless connections 132 and 136 using a peer-to-peer protocol that supports persistent groups. In this example, camera 130, printer 134 and computing device 110 may form a persistent group according to a peer-to-peer protocol. Though, in alternative embodiments, computing device 110 may form a first group with camera 130 and a second group with printer 134. Accordingly, it should be appreciated that a group may be made up of any suitable number of devices, including only two devices.

Wireless connections 132 and 136 may be formed according to any suitable peer-to-peer protocol. In this example, connections 132 and 136 are formed using an extension of the Wi-Fi protocol, referred to as Wi-Fi Direct. Connections 132 and 136 may be formed as persistent connections, in accordance with that protocol. As a result, each of the devices that forms a group with another device may store group profile information representing groups of two or more devices that have performed pairing in order to establish a connection. The group profile information may be used to reestablish a connection if it is disrupted. This information may be stored in association with an identifier of user 112.

The group profile information and identifier of user 112 may be stored internally to the devices, such as camera 130 and printer 134. Computing device 110 may similarly store that information internally. Though, computing device 110, and any of the other devices, may store that information externally, such as by using a network connection.

In this example, computing device 110 also has a wireless connection through access point 120 to network 124. Wireless connection 122 through access point 120 is an example of an infrastructure type connection. Any suitable technique may be used to form wireless connection 122, including techniques that employ known infrastructure type protocols. As one example, wireless connection 122 may be formed using a protocol sometimes called "Wi-Fi." Though, the specific protocol used is not critical to the invention.

In the example illustrated, computing device 110 has the role of a station in wireless connection 122. The role of the computing device 110 indicates the specific steps of the wireless protocol performed by computing device 110 in order to exchange information with access point 120.

Network 124 may be a home network, an enterprise network, the Internet or any other suitable network. However, in the embodiment illustrated, network 124 may be the Internet, allowing computing device 110 to access computing devices, such as server 140, from anywhere in the world the Internet can be accessed.

Here, server 140 represents a server provided by an external service to which a user may have log-on credentials. Those credentials may be entered into computing device 110 to identify the user. In some embodiments, those credentials may be used to allow computing device 110 to access information on server 140.

Computing device 110 also may use the credentials, for example, to determine whether user 112 will be granted access to components on computing device 110, using security mechanisms as are known in the art. Additionally, computing device 110 may use user log-on credentials to identify profiles associated with the user, which in turn may be used to configure the computing device to operate according to preferences previously established by user 112, also using techniques as are known in the art. The credentials used to control access to and configuration of computing device 110 may be the same as or different than the credentials for server 140.

Access to information on server 140 may include storing information. In some embodiments, access to server 140 may entail storing persistent group profile information generated by computing device 110 upon pairing with one or more remote devices, such as camera 130 or printer 134.

Alternatively or additionally, accessing server 140 may entail retrieving information. When persistent group profile information is stored on server 140, it may be associated, through user credentials, with user 112. Accordingly, the information may be downloaded to any computing device operated by user 112 and to which user 112 has provided those credentials.

Figure 1B:
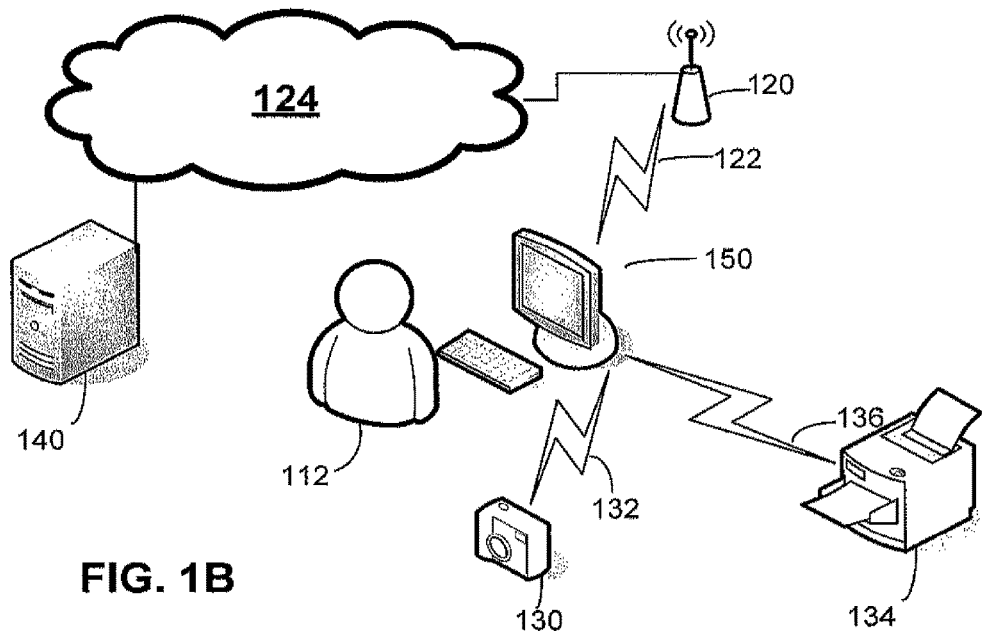
FIG. 1B is a sketch of the exemplary environment of FIG. 1A, shown at a second time when a user is operating a second computing device.

For example, at a later time, as illustrated in FIG. 1B, user 112 may operate computing device 150. User 112 may enter into computing device 150 the same credentials entered into computing device 110 (FIG. 1A). Accordingly, computing device 150 may use those credentials to similarly access server 140. In the scenario illustrated in FIG. 1B, computing device 150 may access server 140 to download persistent group profile information uploaded through computing device 110. In this way, server 140 and network 124 provide a mechanism to migrate persistent group profile information from one computing device to another operated by the same user. In this case, credentials input by a user provide a mechanism for each of computing device 110, server 140 and computing device 150 to associate the persistent group profile information with the same user.

In some embodiments, credentials input by a user may be used to generate an identifier of user 112 that is associated with the group profile information generated when computing device 110 pairs with one or more other devices. The identifier of user 112 may be generated in the same fashion from the credentials input by a user regardless of the computing device operated by user 112.

For example, FIG. 1B illustrates user 112 operating computing device 150 at a later time. Like computing device 110 (FIG. 1A), computing device 150 is positioned in the vicinity of remote devices, such as camera 130 and printer 134. Computing device 150 is equipped to wirelessly communicate with these remote devices. Accordingly, computing device 150 may form peer-to-peer groups with either or both of camera 130 and printer 134. These groups may be formed by the devices performing a pairing ceremony, which may require user action. Though, a group may be formed according to a peer-to-peer protocol that supports persistent groups if at least two devices each associate the other with a persistent group profile for the same group. Such group profile may be selected based on a user identifier.

In accordance with some embodiments of the peer-to-peer protocol that may be used by computing devices, such as computing device 110 and computing device 150, computing device 150 may transmit messages that include an identifier for user 112. Remote devices such as camera 130 and printer 134, upon receiving such messages, may associate them with a computing device being operated by user 112. Because persistent group profiles may be associated with a user instead of or in addition to a device, those remote devices may identify a persistent group profile generated based on a previous pairing with a computing device operated by user 112. The remote devices can then use that persistent group profile to establish, without repeating a pairing ceremony, a peer-to-peer group with computing device 150. Computing device 150 may use a corresponding persistent group profile migrated from computing device 110 to form a group. This group may be established even though the persistent group profile was established while user 112 was operating computing device 110 (FIG. 1) at an earlier time. As a result, the peer-to-peer groups established by user 112 while operating computing device 110 carry over to other computing devices operated by user 112, including computing device 150 in this example.

Figure 2:
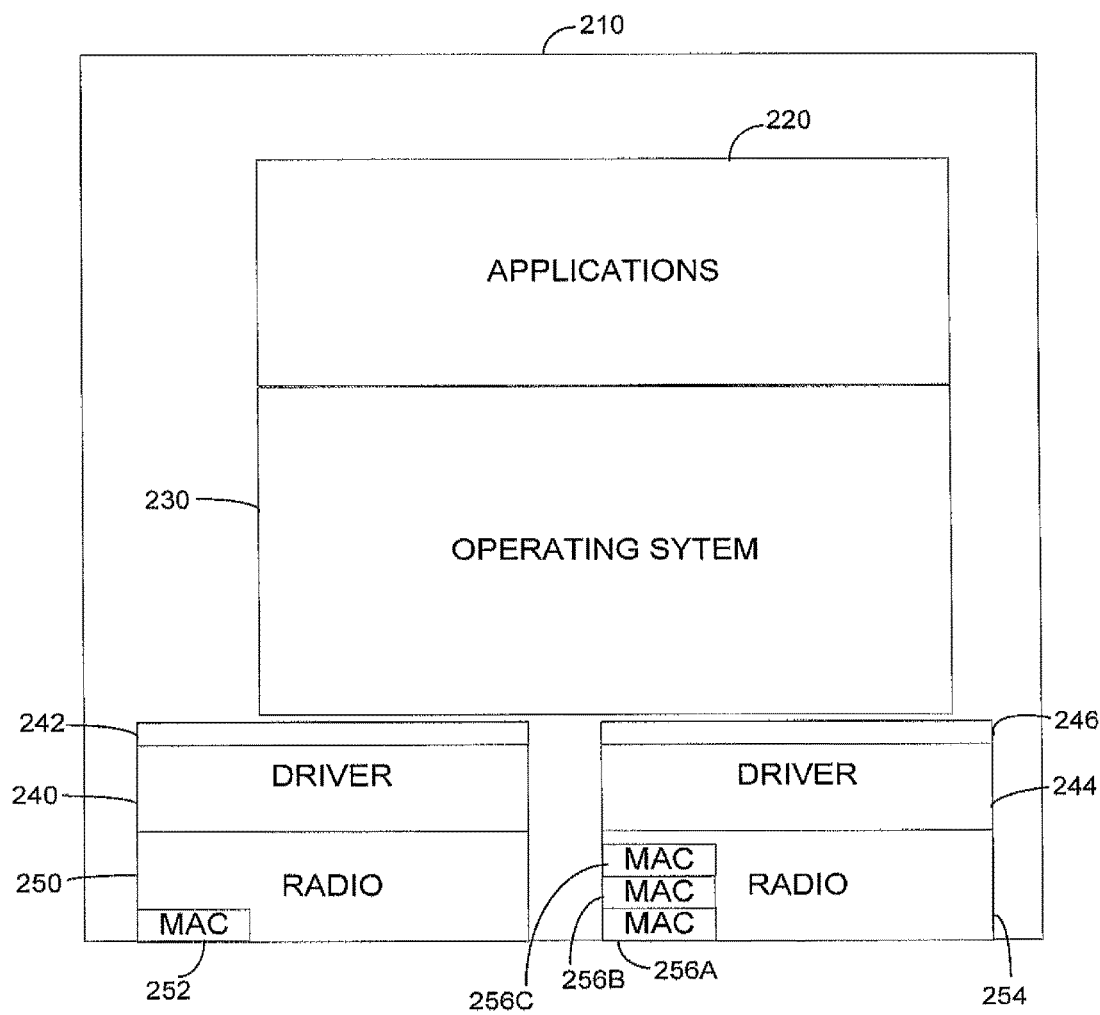
FIG. 2 is a high level block diagram of an exemplary computing device adapted for wireless communication.

Wireless devices operating according to a peer-to-peer wireless protocol may be implemented in any suitable way. An exemplary embodiment is provided in FIG. 2. FIG. 2 illustrates, at a high level, an architecture for computing device 210 that may be operated to form an infrastructure mode wireless connection, such as wireless connection 122 (FIGS. 1A and 1B) and peer-to-peer wireless connections, such as connections 132 and 136 (FIGS. 1A and 1B). In the example of FIG. 2, computing device 210 includes two radios, radio 250 and radio 254. Each of the radios may be adapted to send and receive wireless communications. Radio 250, for example, may be used to form wireless connection 122. Radio 254, for example, may be used to form peer-to-peer connections 132 and 136.

In this example, radio 250 has a media access control (MAC) address 252. The MAC address may be a unique identifier associated with radio 250 such that it may be used to distinguish radio 250 from radio 254 and also from radios in any other devices with which computing device 210 may communicate. Accordingly, the MAC address 252 may be included in packets sent by radio 250 to indicate that the frame was sent by radio 250 or may be included in packets directed to radio 250 to indicate that a frame is intended for radio 250.

MAC address 252 may be assigned to radio 250 in any suitable way. It maybe assigned, for example, by the manufacturer of radio 250. Though, in some embodiments, MAC address 252 may be assigned by operating system 230 or another component of computing device 210 or by some other component in a system in which computing device 210 is operating.

Radio 250 may be controlled through software, represented as driver 240 in FIG. 2. Here, driver 240 includes an interface 242 through which operating system 230 may issue commands to driver 240 and through which driver 240 may report status and notify operating system 230 of received data. Interface 242 may be implemented in any suitable way, including according to a known standard. An example of such a known standard is called NDIS, but that standard is not critical to the invention.

Interface 242 may support a number of commands in a format that does not depend on the construction of radio 250. Rather, driver 240 may translate the commands, in the standardized format of interface 242, into specific control signals that are applied to radio 250. Additionally, driver 240 may be programmed to perform certain low level functions associated with a wireless connection. For example, upon receipt of a packet, driver 240 may check that the packet is properly formatted. If the packet is properly formatted, driver 240 may control radio 250 to generate an acknowledgement. Conversely, if the packet is not properly formatted, driver 240 may control radio 250 to transmit a negative acknowledgement.

Though driver 240, and in some instances radio 250, may automatically perform low level functions associated with establishing and maintaining a wireless connection, higher level functions may be performed under control of operating system 230 or applications 220. In some embodiments, an application 220 or operating system 230 may provide a user interface such that ultimate control of wireless communication is provided by a user of computing device 210.

In the embodiment illustrated in FIG. 2, computing device 210 also includes a radio 254. While radio 250 may be used, for example, for a connection to an infrastructure network, radio 254 may be used to form one or more peer-to-peer connections, such as connections 132 and 136.

Radio 254 is incorporated into computing device 210 with generally the same architecture as radio 250. Radio 254 is associated with a driver 244 that provides a mechanism for operating system 230 to control radio 254. Driver 244 has an interface 246 through which operating system 230 may send commands to driver 244 and driver 244 may provide status to operating system 230. Interface 246, like interface 242, may be a standardized interface such that operating system 230 may communicate with driver 244 using a similar set of commands as are used to control driver 240. Though, because radio 254 is used to implement peer-to-peer connections, driver 244 may respond to different or additional commands than driver 240 in order to implement functions associated with peer-to-peer communications that do not exist for infrastructure based communications.

As an additional difference between radios 250 and 254, radio 254 is illustrated as having multiple MAC addresses. In contrast, radio 250 includes a single MAC address 252. Here, MAC addresses 256A, 256B and 256C are illustrated. Multiple MAC addresses, for example, may be assigned by a manufacturer of radio 254 or the MAC addresses may be assigned in any suitable way, including as described above in connection MAC address 252. Alternatively, one or more of the MAC addresses may be assigned based on an identifier of the user of computing device 210.

Having multiple MAC addresses allows radio 254 to appear to devices external to computing device 210 as multiple entities, each with a separate MAC address. As an example, if computing device 210 is separately communicating as a group owner in a first peer-to-peer group and as a client in a second peer-to-peer group, separate entities may be established for the group owner and the client. Devices external to computing device 210 may address packets intended to be processed by computing device 210 as a group owner in the first group with a first MAC address. Packets intended to be processed as a client in the second group may be addressed with a second MAC address. Similarly, computing device 210 may insert the first MAC address in packets coming from the group owner; packets from the client may include the second MAC address.

To allow operating system 230 to associate its interactions with driver 244 with a specific one of those entities, internal to computing device 210, each of the entities may be represented as a port. Accordingly, operating system 230 may send commands to or receive status information from each such entity through a port associated with that entity.

Each of the ports may be configured to perform functions appropriate for the type of entity the port represents. An embodiment in which computing device 210 operates according to a Wi-Fi Direct, which is used herein as an example of a peer-to-peer protocol, a device that is part of a peer-to-peer group may take on a role of a group owner or a client. A group owner may be required in accordance with a wireless protocol to send certain types of action frames and respond to other types of action frames in specified ways. A device configured as a client may send different action frames and responses or may send the same action frames and responses in different contexts.

Though, it should be appreciated that a group owner and a client are just two examples of the roles that radio 254 and driver 244 may be configured to perform. As another example, an entity may be configured as neither a group owner nor a client. Rather, an entity may be assigned a role as a controller that manages interactions with other devices to form a group and determine the role of computing device 210 in that group.

Though FIG. 2 illustrates separate radios, radio 250 and radio 254, in embodiments in which infrastructure connections and peer-to-peer communications operate using the same frequency channels, a single radio may be used. In such an embodiment, entities performing roles associated with infrastructure communication and entities performing roles associated with peer-to-peer communications may be implemented with the same radio.

Figure 3:
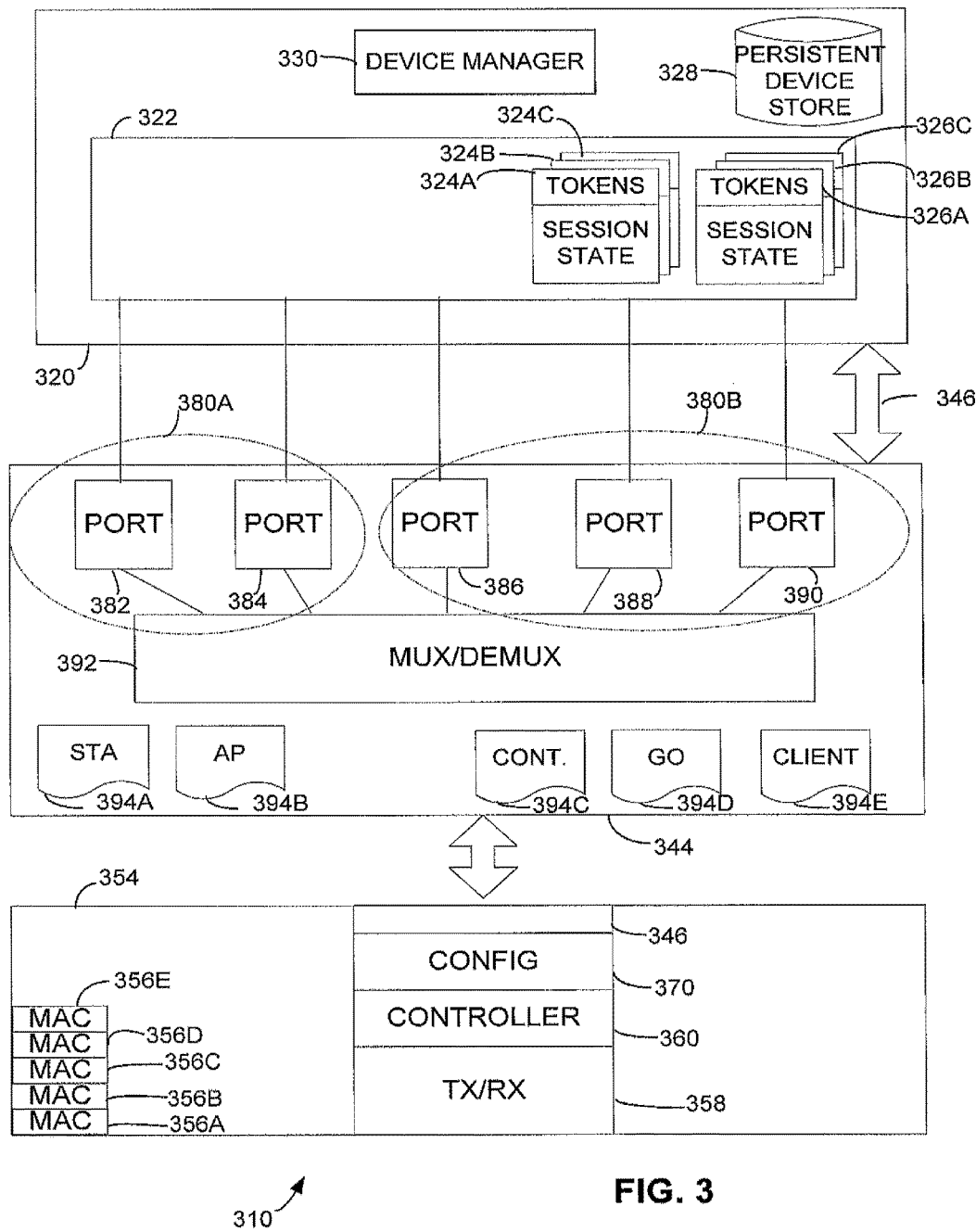
FIG. 3 is a more detailed block diagram of an exemplary computing device adapted for wireless communications.

FIG. 3 illustrates an embodiment in which a computing device 310 is configured to support, using a single radio, both entities that have a role in an infrastructure network and entities that have a role for peer-to-peer communication. FIG. 3 illustrates computing device 310 containing a radio 354. Radio 354 is illustrated as having multiple MAC addresses, illustrated as MAC addresses 356A, 356B, 356C, 356D and 356E. Though five MAC addresses are illustrated, which may allow radio 354 and its associated driver 344 to concurrently provide five ports, it should be appreciated that the specific number of MAC addresses supported is not critical to the invention and more or less than five MAC addresses may be used in some embodiments.

In this example, the five MAC addresses may be used to provide five ports 382, 384, 386, 388 and 390, each configured to perform a different role. In the scenario illustrated, a group 380A of these ports has been configured to implement entities used for infrastructure based communications. Group 380B contains ports configured for peer-to-peer communications.

In the example illustrated in FIG. 3, group 380A contains two ports, ports 382 and 384. Group 380B is shown containing three ports, ports 386, 388 and 390. It should be appreciated that the number of ports allocated for each type of use is not critical to the invention and any suitable number may be used. Moreover, it is not a requirement that the number of ports in each group remain static. Rather, operating system 320 may issue commands to driver 344 to dynamically create or break down ports as needed.

In conjunction with a command to create a port, operating system 320 may specify a role associated with that port. Driver 344 may respond to such a command by creating a port configured for a designated role, which may be associated with infrastructure-based communications or with peer-to-peer communications. Though operating system 230 may specify a role, the role specified may be determined in any suitable way. For example, when forming a peer-to-peer group, operating system 320 may determine the role by controlling computing device 310 to wirelessly exchange messages with other devices in the group to collectively negotiate a role for each device.

Though any suitable mechanism may be used to implement a capability to assign a role to computing device 310, FIG. 3 illustrates an interface 346 between operating system 320 and driver 344. Interface 346 may be an interface to a driver in a standardized format. As one example, some drivers are written in accordance with the NDIS interface specification. In accordance with that specification, commands and status information may be exchanged between driver 344 and operating system 320 using programming objects called OIDs. The NDIS standard defines a number of OIDs that drivers should or may respond to. The standard, though, is extensible such that OIDs may be defined to support additional functionality in certain circumstances. This extensibility may be used to define commands, using OIDs or other suitable representation, that allows operating system 320 to command driver 344 to create or break down a port or to configure a port for a specific role.

Though radio 354 can process packets for multiple ports, other than supporting multiple MAC addresses, radio 354, in some embodiments, need not be specially configured for supporting ports. Radio 354 may be implemented using techniques as are known in the art. In this example, transmitter/receiver section 358 may be a hardware component as is known in the art and used for wireless communications. In this example in which radio 354 is being used to support communications in accordance with the Wi-Fi infrastructure-mode protocol and the Wi-Fi direct protocol for peer-to-peer communications, transmitter/receiver section 358 may support communications in multiple subchannels over a frequency range defined by the Wi-Fi specification. Though, the specific operating characteristics of transmitter/receiver section 358 may vary depending on the specific protocol implemented for communication and are not critical to the invention Likewise, controller 360 may be a hardware component as is known in the art of wireless radio design. Similarly, configuration register 370 may be a hardware component as is known in the art of wireless radio design. The components indicated as MAC address 356A . . . 356E may also be implemented using techniques as are known in the art. In some embodiments, the MAC addresses supported by radio 354 may be encoded in a read only memory or other component that is a portion of radio 354. Though, it should be appreciated that, in embodiments in which MAC addresses are assigned to radio 354 through driver 344, MAC addresses 356A . . . 356E may be physically implemented in either volatile or non-volatile rewriteable memory such that the pool of MAC addresses to which radio 354 can respond may be dynamically created.

Regardless of the manner in which the components of radio 354 are implemented, radio 354 may contain a hardware interface 346 through which driver 344 may control radio 354. In some embodiments, driver 344 may be computer executable software instructions executing on a processor within computing device 310. Accordingly, hardware interface 346 may be implemented as a bus connection or other suitable interconnection between the processor executing driver 344 and a separate card holding radio 354. Though such hardware interfaces are known in the art, any suitable interface may be used.

To configure radio 354 to support a port, driver 344 may configure radio 354 to process packets for a specific MAC address associated with communications through that port. Driver 344 may write a value into configuration register 370 indicating that a MAC address should be activated such that radio 354 will process received packets identified with that MAC address. In operation, controller 360 may control transmitter/receiver section 358 to respond to any packets identified with a MAC address identified as active by information in configuration register 370. Accordingly, if multiple ports are active, configuration register 370 will contain an indication of each of the active MAC addresses.

In addition to configuring radio 354 to respond to a MAC address for a port, driver 344 may specify communications parameters to be used with that MAC address. These parameters may specify, for example, that a different number of subchannels may be used for communication with different MAC addresses. In this way, communication characteristics of different ports may be controlled based on the role associated with the port. As a specific example, a port configured as a control port may require lower bandwidth than a port for communicating data. Accordingly, radio 354 may be configured to use fewer subchannels or a different encoding scheme for a MAC address that is associated with a control port.

For information to be transmitted, driver 344 and/or radio 354 may be operated such that any frames transmitted containing such information will be identified by the MAC address associated with the port for which the information is being transmitted. Any suitable mechanism may be used to associate MAC addresses with specific frames sent from or received for a specific port. Moreover, this processing may be performed partially or totally within driver 344 and partially or totally within radio 354 because the specific implementation does not impact functioning of the ports.

To implement multiple ports, driver 344 may also be configured. In this example, driver 344 is illustrated to contain computer executable instructions that implement a multiplexer/demultiplexer 392. Multiplexer/demultiplexer 392 operates to route received packets associated with a port to a portion of driver 344 that implements the functionality of the respective port. Conversely, multiplexer/demultiplexer 392 receives packets for transmission from any of the ports and routes those packets to radio 354.

In scenarios in which multiple ports simultaneously have information for transmission, multiplexer/demultiplexer 392 may mediate to establish the order in which radio 354 receives information from the ports. For this purpose, multiplexer/demultiplexer 392 may use any suitable policy. For example, packets carrying action frames may be given priority over packets with data frames. As another example of a policy, transmissions associated with ports operating in infrastructure mode may be given priority over ports operating in peer-to-peer mode. As yet another example, a port configured for the role of group owner may be given priority over a port configured for the role of client in a peer-to-peer group. Though, the specific policies applied by multiplexer/demultiplexer 392 are not critical to the invention, and any suitable policies may be employed.

In addition to configuring multiplexer/demultiplexer 392 to route packets, driver 344 may be configured by associating specific functional modules with each of the ports. The specific functional module associated with the port may be based on the role assigned to that port. For example, FIG. 3 illustrates five functional modules. Functional module 394A, when associated with a port, may configure that port to operate in the role of a station in an infrastructure network. Similarly, functional module 394B, when associated with a port, may configure that port for the role of an access point in an infrastructure network. Functional module 394C, when associated with a port, may configure that port for operating in the role of a controller in peer-to-peer mode. The controller, for example, may control communications as the device negotiates or renegotiates a role in a peer-to-peer group. Functional module 394D, when associated with a port, may configure that port for the role of group owner in a peer-to-peer group. Functional module 394E, when associated with a port, may configure that port for the role of client in a peer-to-peer group. Other functional modules, though no illustrated in FIG. 3, may alternatively or additionally be included.

Functional modules 394A . . . 394E may be implemented in any suitable way. For example, each of the functional modules may be implemented as a collection of computer executable instructions that are encoded to perform functions for the role associated with the functional module. For example, functional module 394A may be encoded with instructions that control radio 354 to transmit packets as appropriate for a station in an infrastructure network. Additionally, functional module 394A may contain instructions that allow driver 344 to interact with operating system 320 in a way that implements the behaviors of a station in an infrastructure network. As a specific example, functional module 394A may be encoded to automatically generate responses to certain received frames. Additionally, functional module 394A may be encoded to transfer data received in a frame to a location in memory on computing device 310 and then notify operating system 320 that data has been received. Further, functional module 394A may configure radio 354 for the role of that functional module. Such configuration may include setting a number of subchannels or other parameters of the wireless communications used in the specified role. The operations performed by functional module 394 may be similar to those performed in a conventional driver for a wireless network interface card configured only as a station in a Wi-Fi network, and functional module 394 may be encoded using techniques as are known in the art.

Each of the other functional modules may be similarly encoded to interact with the operating system 320 and radio 354 to configure radio 354 and to internally process and generate communications as appropriate for its respective role. Functional module 394B, for example, may be encoded with computer executable instructions that perform operations on or respond to received frames with behaviors as are known in the art for an access point in an infrastructure network. Also, functional module 394B may be encoded to interact with operating system 320 using techniques as are known in the art.

Functional module 394C may be encoded to perform functions associated with establishing a peer-to-peer group. The instructions that implement functional module 394C may likewise be written using techniques that are known in the art. Those instructions may cause radio 354 to transmit packets containing action frames or responses to action frames of the type used in establishing a group for peer-to-peer communication according to a specific protocol and that negotiate or renegotiate roles of devices for such a group. Components within operating system 320 may trigger the sending of those action frames. Though, for some action frames, functional module 394C may be configured to generate a response to an action frame without express action by operating system 320. Table 1 lists examples of action frames that functional module 394C may be commanded to send by operating system 320. These action frames represent action frames appropriate for a Wi-Fi Direct protocol. Additional action frames used in that protocol may be sent without an express command in response to a received action frame or other suitable trigger. Though, it should be appreciated that different or additional action frames may be used for different protocols, and the specific action frames is not a limitation on the invention.

TABLE I

| Action Frame | Dialog Token Generated by Driver | Port Remains Available After Successful Transmission For Receiving Replies | Receive Indicated to OS |
| --- | --- | --- | --- |
| GO Negotiation Request | Yes | Yes | Yes |
| GO Negotiation Response | No | Yes if the response indicates that the negotiations were successful, No Otherwise | Yes |
| GO Negotiation Confirmation | No | No | Yes |
| P2P Invitation Request | Yes | Yes | Yes |
| P2P Invitation Response | No | No | Yes |
| Provision Discovery Request | Yes | Yes | Yes |
| Provision Discovery Response | No | No | Yes |

When the operating system 320 submits a request to a control port to send one of the action frames in Table I, functional module 394C within driver 344 may take actions such as:

a. Select a dialog token for the transmission. If the send is in response to a request, the operating system may provide the dialog token (as described below) to be used, and driver 344 may then use the specified dialog token.

b. Complete the request. If driver 344 selected the dialog token, it may report the dialog token to the operating system 320 in the completion of the request.

c. Sync with the Wi-Fi Direct device to which the frame is targeted. Depending on the implementation, if the send is in response to a received request (e.g. Invitation Response sent on reception of an invitation request), this step may be omitted.

d. Send the frame & wait for an ACK.

e. Once the ACK for the frame is received or if none of the retry attempts get an ACK, send a NDIS_STATUS indication to operating system 320 to notify about the transmission status of the action frame. This indication may include the information elements from the packet containing the action frame.

If the send was for a frame that would receive a reply from the peer device and the transmission was successful, the port may remain available for the peer device to send reply action frames to the miniport. The timeout and mechanism of being available may follow the Wi-Fi Peer-To-Peer Technical Specification.

The specific component within operating system 320 that triggers functional module 394C to send action frames when functional module 394C is associated with a port is not critical to the invention. However, FIG. 3 illustrates a device manager 330 within operating system 320. Device manager 330, for example, may be a device manager as is known in the art that may present a user or programmatic interface through which a user or other executing component may request that a communication session be established with a device using peer-to-peer communication.

When a port, such as port 386, is configured to act as a controller for peer-to-peer communication by associating that port with functional module 394C, device manager 330 may interact with port 386 to control various aspects of establishing peer-to-peer communication with one or more devices. For example, device manager 330 may receive user input requesting that computing device 310 be wirelessly connected to a device such as printer 134 (FIGS. 1A and 1B). In response to such input, device manager 330 may interact through stack 322 with port 386, causing functional module 394C to control radio 354 to transmit action frames.

The transmitted action frames may be those associated with device or service discovery. Device manager 330 may specify the nature of those requests, such as whether functional module 394C should seek to discover any device in the vicinity of computing device 310 or only devices that provide an identified service, such as a printer service. Though, device manager 330 may be configured to send commands in other formats through port 386 to establish communication with one or more devices in a group.

As an example, FIG. 3 shows that operating system 320 maintains a persistent device store 328. Persistent device store 328 may contain information identifying devices with which computing device 310 has previously established wireless communication. Such information, for example, may constitute persistent group profiles, one or more of which may be associated with an identifier of a user. Device manager 330 may access information in persistent device store 328 to identify specific devices and send commands through port 386 for functional module 394C to generate action frames to establish a wireless connection with a device identified in persistent device store 328. These actions may occur automatically, in response to user input or in response to any other suitable trigger. In embodiments in which persistent group profile information is associated with a user of a computing device, persistent device store 328 may store information identifying a user of computing device 310 at the time a group for which information is stored in persistent device store 328 was formed.

In scenarios in which device manager 330 requires information, such as a password or identifier, to establish communication with an external device, device manager 330 may alternatively or additionally interact with a user through a user interface (not expressly shown in FIG. 3) to obtain that information from a user or some other source. That information, which, for example, may be obtained during pairing of computing device 310 to one or more remote devices, may be stored in persistent device store 328. In this way, information obtained from a user, such as during a pairing ceremony with a remote device need not be acquired from the user again to re-establish a peer-to-peer connection with the remote device. Rather, the information may be obtained from persistent device store 328. Though, regardless of the manner in which information input from a user is acquired, when that acquired information needs to be transmitted, device manager 330 may interact with the port configured as a controller to cause that information to be sent.

Regardless of the mechanism that triggers a port configured as a control port, such as port 386, to identify a group of devices, the control port may send and receive action frames to identify one or more devices that form a group including computing device 310. The actions initiated through port 386, in addition to identifying the group, may negotiate a role for computing device 310 within that group. In the illustrated example of the Wi-Fi Direct peer-to-peer protocol, a device may have a role in a group as the group owner or as a client. Communication with another device or devices in the identified group may be performed through a different port. That port may be configured to support behavior in the role identified for computing device 310.

In the example illustrated in FIG. 3, additional ports 388 and 390 are illustrated. Each of these ports may be associated with a different role. For example, port 388 may be associated with the role of group owner. Port 390 may be associated with the role of client. Configuring a port for a different role may be performed by associating the port with the functional module that performs operations associated with the role. For example, functional module 394D, which performs functions associated with a device operating as a group owner, may be associated with port 388. Likewise, functional module 394E, which performs functions associated with the device operating as a client, may be associated with port 390.

In operation, as packets are received through radio 354 having MAC addresses associated with ports 388 or 390, multiplexer/demultiplexer 392 will route those packets for processing within the associated port. Packets routed to port 388 may be processed by functional module 394D, which may perform actions associated with the role of a group owner. Packets containing data frames may be processed by placing the data in memory and notifying stack 322 that data has been received. Such an interaction with operating system 320 may use stack signaling techniques as are known in the art. Though the specific mechanism by which communication between each port and operating system 320 occurs is not critical to the invention.

When action frames are sent as part of a session established with a group in which computing device 310 is the group owner, those action frames may likewise be routed by multiplexer/demultiplexer 392 to port 388. Functional module 394C may be configured to either respond to those action frames or may be configured to report the action frames to operating system 320 depending on whether functional module 394C is programmed to respond to them.

Similarly, if computing device 310 is configured for the role of a client in a group, packets relating to communication with devices in that group will be identified with a MAC address that causes multiplexer/demultiplexer 392 to route those packets to a port configured as a client, such as port 390. Port 390 may be associated with functional module 394E, implementing functionality of a client according to a peer-to-peer protocol. Functional module 394E may be configured to transfer data from data frames in such packets to memory and notify operating system 320 of that data, using techniques as are known in the art. Functional module 394E may respond to packets containing action frames or may notify operating system 320 of those management frames.

Functional modules 394C, 394D and 394E may be coded to implement functions prescribed in accordance with a peer-to-peer protocol, such as Wi-Fi Direct protocol. Additionally, functional modules 394C, 394D and/or 394E may be configured to support persistent groups associated with users. Configuring the functional modules may include incorporating computer executable instructions that, when executed, insert into one or more messages initiated or processed by those functional modules an identifier of the user. In some embodiments, when processing a message that conventionally includes an identifier based on one or more MAC addresses 356A . . . 356E, a functional module may alternatively or additionally incorporate into such a message an identifier of a current user of the computing device. As described above in connection with FIGS. 1A and 1B, such an identifier may be determined based on credentials input by a user of the computing device. Though, such a user identifier may be determined in any other suitable way. In scenarios in which computing device 310 has a role as a group owner, functions performed by the device may include generating an identifier for the peer-to-peer group. In some embodiments, that identifier may include an identifier of the user of the computing device at the time the peer-to-peer group was formed.

Additionally, functions performed by a device operating in accordance with the peer-to-peer protocol may include detecting a remote device with which a persistent peer-to-peer group was previously formed. Upon detecting such a remote device, functions performed by the device may include establishing communication with that remote device based on previously stored persistent profile information. These functions may be implemented by appropriately configuring functional module 394C. Though, any suitable implementation may be used.

FIG. 3 illustrates a specific hierarchy of communication functions. Certain functions relating to communication with external devices are performed within radio 354. Other functions are performed within driver 344. Yet further functions are performed within operating system 320. Though not specifically illustrated, even further functions may be performed by applications 220 (FIG. 2) or by input from a user or source external to computing device 310. With such an architecture, higher level functions, such as determining which devices to connect to as part of a peer-to-peer group, may be performed at higher levels in the architecture. Conversely, lower level functions, such as generating an acknowledgement to a received packet may be performed at lower levels in the architecture. For example, driver 344 may be configured to generate such an acknowledgement.

Though other architectures are possible that may partition the functions differently so that different aspects of communication are controlled by different components, in the example illustrated, radio 354 and driver 344 are configured to respond statelessly to events, such as commands or received packets. To the extent state information is involved in a communication session, that state information may be maintained within operating system 320. For example, stack 322 may maintain state information for communication sessions carried on through any of the ports 382, 384, 386, 388 and 390. The specific state information maintained may depend on the number and types of states within a protocol supported by each of the ports.

In the example of FIG. 3, session state information 324A is shown associated with port 388. Though not expressly illustrated, session state information may be maintained for other ports. Depending on the protocol implemented by port 388, such session state information may indicate parameters of a session, such as a number of devices that are joined in a group for which computing device 310 is the group owner. Other state information, such as a time until those devices may enter a lower power mode, may also be stored as part of the session state information 324.

FIG. 3 additionally shows session state information 324B and 324C associated with port 388. State information 324B and 324C may describe different sessions. Such sessions may arise if computing device 310 is joined in three groups in which it is the group owner. To support multiple such sessions, a mechanism may be provided to associate specific frames sent or received with a corresponding session. Any suitable identifier or identifiers may be used. For example, communications with a group of devices may be regarded as a session, such that an identifier of a group may be used to aggregate related communications as part of a session. Stack 322 provides an interface to device manager 330 or other components that associates each session with the appropriate component that is an end point in that session. Such interfacing may be performed using techniques as are known in the art.

In addition to maintaining state information that allows communications from separate sessions to be presented appropriately, stack 322 may maintain, as part of the state information maintained for each session, information that allows stack 322 to relate communications that are part of an exchange of communications to perform a function. For example, when a frame, representing a request, is sent, recognizing that a subsequently received frame is a response to that request may facilitate processing of the request and response. Providing a mechanism to relate communications that are part of an exchange may facilitate processing, particularly if multiple sessions are supported on the same port. To enable recognition of communications that are part of an exchange, "dialog tokens" may be used. A communication initiating an exchange may be tagged with such a dialog token. Upon responding to such a communication, the dialog token from the request may be copied to the response. Accordingly, a device sending a request may associate a response, or any other communication that is part of the same exchange, with the request. Accordingly, state information 324A may contain dialog tokens associated with ongoing communications involving any device communicating as part of the session.

Dialog tokens may be generated in any suitable way. They may be generated, for example, within the operating system 320. Alternatively, if a packet beginning a dialog is initiated in a port, the port or other component within driver 344 may generate the token. Similarly, if a reply to a packet is generated within a port, such as port 386, 388 or 390, the token may be inserted in the reply by that port. Conversely, if a reply to a packet is initiated in response to a command generated within operating system 320, a component within operating system 320, such as stack 322 may specify the token for inclusion in the reply. Table I indicates, for the listed action frames, whether the dialog token associated with an action frame is generated in the operating system or, if not, in the driver. Though, it should be appreciated that Table I represents only one example of how the functionality of generating a dialog token for a frame may be partitioned, and any suitable partitioning of that function may be used.

Similar session state information 326A, 326B and 326C is shown in connection with port 390. Session state information 326A, 326B and 326C may represent state maintained for each of three sessions, with each session being associated with a group in which computing device 310 is a member with the role of client. As with session state information 324A, 324B and 324C a unique dialog token may be associated with each of the sessions, allowing stack 322 to separate received packets associated with each of the sessions Likewise, computing device 310 may cause a dialog token to be associated with packets transmitted from computing device 310. The dialog tokens may be used to allow stack 322, or similar processing components on remote devices that receive packets from computing device 310, to associate packets that are part of a multi-packet exchange of information. For example, a second packet sent in reply to a first packet may include the token from the first packet. As a result, when the sender of the first packet receives the second packet, it can associate the first packet and second packet with the same dialog.

With the architecture illustrated in FIG. 3, state information concerning each of the connections may be maintained within operating system 320. As a result, the ports 386, 388 and 390 need not maintain state information. In some embodiments, functional modules, such as functional modules 394C, 394D and 394E, that implement the functions of a port do not maintain state information. Rather, each of the functional modules may be encoded to respond to events, such as a command from operating system 320 or a received packet passed on by radio 354. Though, regardless of how this functionality is partitioned, computing device 310 may be controlled to supply functionality associated with multiple entities by establishing and configuring a port to perform the functionality of each entity. As a result, computing device 310, because driver 344 and radio 354 may be configured to support multiple ports, may concurrently operate as different entities. These entities may include entities associated with infrastructure mode communication as well as entity associated with peer-to peer communication.

Though, regardless of how a computing device is architected, the device may implement functions defined in an infrastructure mode protocol and/or a peer-to-peer protocol. Functions performed by a device operating in accordance with a peer-to-peer protocol may include forming a group of two or more devices for peer-to-peer communication. One aspect of forming a group may include selecting a device of the group to perform functions associated with control of the group. Such functions, for example, may include determining which devices are allowed to join the group, providing an identifier for the group and providing addresses for devices within the group. In the example embodiment described herein, such a device may be a group owner. Other devices that are part of the group may be clients of the group owner.

Another aspect of forming a group may be determining whether the group is to be a persistent group. Whether a group is to be a persistent group may be determined based on information exchanged between devices, or in any suitable way. If the group is persistent, forming a group may entail creating and storing a persistent group profile. In some embodiments, an identifier of a user may be stored in association with the persistent group profile.

Yet a further aspect of forming a group may be detecting a nearby known device, selecting a persistent group profile that is appropriate for forming a group with that device and then forming that group based on the persistent group profile.

Figure 4:
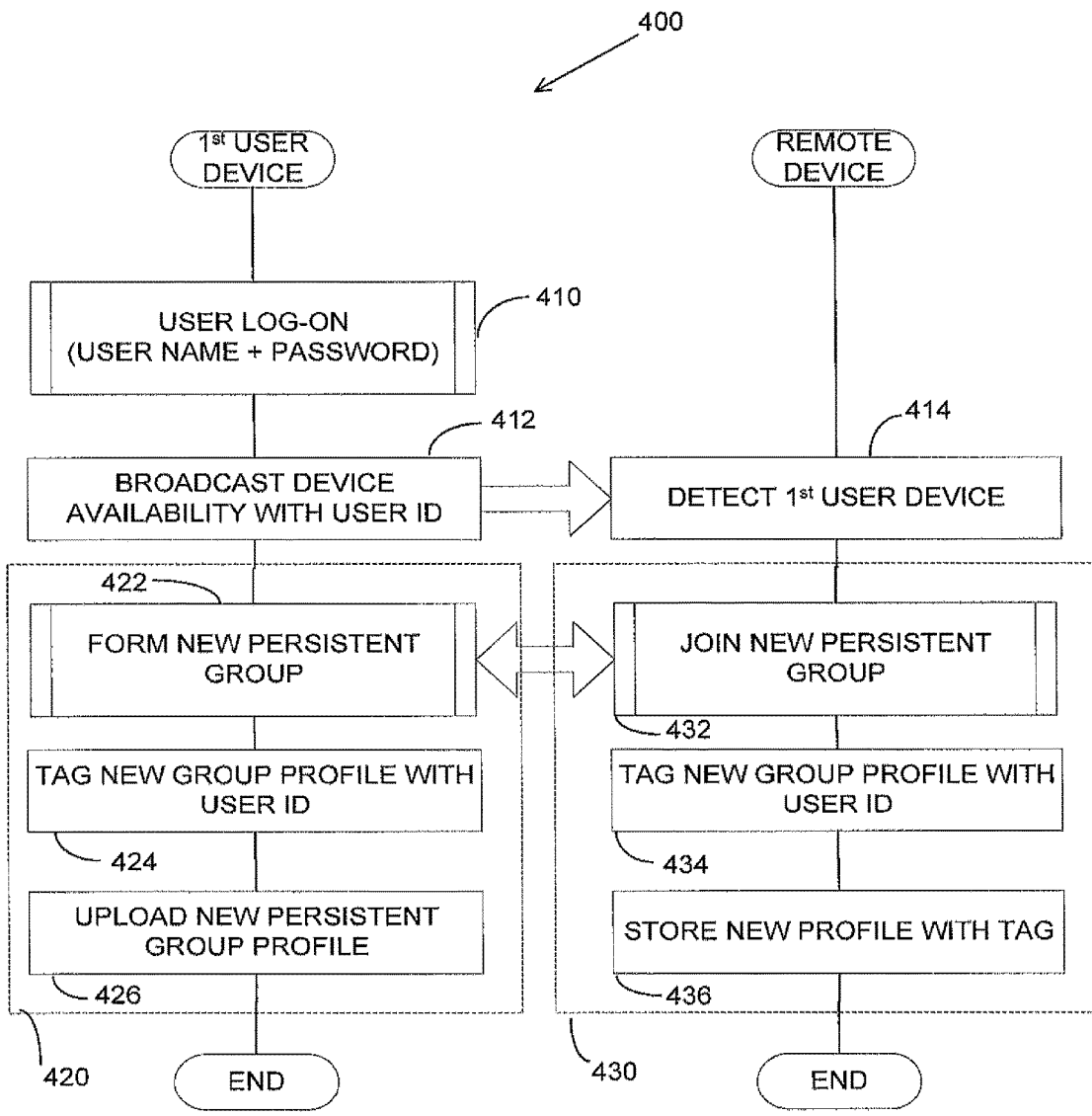
FIG. 4 is a flowchart of an exemplary method of operation of devices forming a peer-to-peer group according to some embodiments.

FIG. 4 illustrates a method by which devices in a group may operate, including forming a persistent group associated with a user. The method 400 is performed by interaction of a first user device and a remote device. The devices that perform the process illustrated in FIG. 4 are not critical to the invention. Any device operated by a user may be the first user device. However, in some embodiments, the first user device may be a computing device, such as computing device 310 (FIG. 3) or computing device 110 (FIG. 1A) or computing device 150 (FIG. 1B). Any suitable device also may act as the remote device performing the method 400. For example, camera 130 or printer 134 (FIGS. 1A and 1B) may be a remote device.

In the exemplary process 400 illustrated in FIG. 4, processing begins with subprocess 410 performed on the first user device. In subprocess 410, a user may log-on to the computing device. Subprocess 410 may be performed in any suitable way, including using a log-on mechanism as is known in the art. As one example, subprocess 410 may include a component of an operating system of the first user device presenting a user interface though which a user may input a user name and password or other information that identifies the user. Though, it should be appreciated that the specific components used to perform subprocess 410 is not critical to the invention. In some embodiments, the log-on illustrated in FIG. 4 may entail providing log-on credentials associated with a service hosted external to the first user device. In the example, of FIG. 1B, that service may be hosted on server 140 such that subprocess 410 may be performed by interaction with server 140 or other component external to the first user device. Though, it is not a requirement that the log-on information acquired at subprocess 410 be used for any purpose other than to gain information to identify the current user in messages sent according to a peer-to-peer protocol.

Regardless of the specific mechanism by which subprocess 410 is performed, as a result of performing subprocess 410, the first user device may have access to identifying information relating to the user who performed the log-on process. This user may therefore be inferred to be the current user of the first user device.

At block 412, user information obtained by completing subprocess 410 may be used to determine a user identifier associated with the current user of the first user device. The user identifier may be generated in any suitable way based on the information acquired in subprocess 410. In some embodiments, the user identifier may simply be one or more pieces of information input by the user in subprocess 410. Alternatively or additionally, the user identifier may be generated using one or more pieces of information determined as a result of performing subprocess 410. In some embodiments, the user identifier may be generated by performing a computation on one or more pieces of information input by the user during subprocess 410. For example, generating the user identifier may entail a cryptographic function performed on a user name and/or password entered by a user in subprocess 410.

Regardless of the manner in which the user identifier is determined, the user identifier may be used in messages transmitted by the first user device in accordance with a peer-to-peer protocol, which may be transmitted in response to any suitable event. The identifier, for example, may be incorporated in one or more action frames transmitted by the first user device. In this example, at block 412, the first user device broadcasts a message, such as a probe message formatted in accordance with a peer-to-peer protocol, incorporating the user identifier. Though the specific types of messages in which the user identifier are incorporated is not critical to the invention, in this example, the message transmitted with the user identifier at block 412 may initiate a pairing of the first user device with a remote device in response to user input to form a connection with the remote device such that a group containing at least those two devices is formed. Accordingly, process 400 may proceed to block 414, which may be performed by a remote device.

At block 414, the remote device detects the message sent at block 412 by the first user device and may then pair with the first user device. Accordingly, process 400 proceeds to subprocess 420, performed by the first user device, and subprocess 430, performed by the remote device. In subprocesses 420 and 430, the devices exchange messages resulting in the formation of a group.

Within subprocess 420, the first user device performs subprocess 422. In subprocess 422, the first user device sends and receives messages in accordance with the peer-to-peer protocol that form a persistent group including the remote device. Similarly, within subprocess 430, the remote device performs subprocess 432 in which it joins the persistent group. Processing within subprocess 432 may include sending and receiving messages formatted in accordance with the peer-to-peer protocol.

Processing within subprocesses 422 may also entail accessing information used in forming the persistent group. Such information may be obtained from any suitable source, including user input. For example, as part of forming a group according to a peer-to-peer protocol, a user may input a PIN or other value on which device pairing is conditioned. Alternatively or additionally, such information may be include user commands, such as a command that the group being formed should be a persistent group or that the group should be associated with the user and reformed by any computing device operated by that user. Though, such user input may alternatively indicate that the group being formed, though persistent, should only be reestablished on the first user device. Though, in the embodiment illustrated, the processing in subprocess 420 forms a persistent group that is associated with the user and is reestablished on other computing devices operated by the same user.

In this example, the exchange of messages within subprocesses 422 and 432 leads to the formation of a peer-to-peer group and selection of a device to operate as the group owner for that group. In this example, the first user device is selected as the group owner. Though, it is not a requirement that a computing device operated by a specific user with whom a persistent group is to be associated be selected as the group owner for that persistent group.

Formation of the persistent group in subprocess 422 may result in generation of a profile for the persistent group on the first user device. This profile may include any suitable information that may be used by the first user device to maintain or later re-establish a connection with the remote device and other devices in the group. Similarly, execution of subprocess 432 may result in generation of a profile for the persistent group on the remote device. The information in the profile may include information conventionally stored in a persistent group profile, including a group identifier and a PIN or other information used to reform the group.

One or more of the messages exchanged between the first user device and the remote device may include the user identifier determined at block 412. In this way, each of the devices may associate the persistent group with that user. Accordingly, within subprocess 420, processing may proceed to block 424. At block 424, the first user device may tag the persistent group profile with the user identifier.

Processing at block 424, for example, may entail storing information representing the group profile in persistent device store 328 (FIG. 3) associated with the user identifier. The first user device may subsequently use the profile in persistent device store 328 to reestablish a group when a device identified in the group profile is detected. Though, as described herein, formation of a group based on a profile associated with a user may be contingent upon the user being the current user of the first user device. By associating a user identifier with a group profile at block 424, prior to reestablishing a connection with a device that is a member of a persistent group, first user device may verify that the user of the device at that time is the same user identified by the tag associated with the persistent group profile.

At block 426, the profile, tagged with user identifier, may be made accessible to other devices that may be operated by the same user. In this example, processing at block 426 entails uploading the new persistent group profile to a networked computing device. For example, processing at block 426 may entail storing the new persistent group profile on a server 140 (FIG. 1A). In storing the persistent group profile, the profile may be associated with the user. Any suitable mechanism may be used to associate the profile with the user. For example, the profile may be stored on server 140 in connection with an account maintained for that user. Alternatively or additionally, one or more identifiers for the user may be stored with the profile. The identifiers may include the user identifier generated at block 412 or any other suitable identifier.

The remote device may also store information about the persistent group formed in subprocess 432 that allows the remote device to connect, as part of the persistent group, with any device operated by the same user. Accordingly, subprocess 430 continues from subprocess 432 to block 434. At block 434, the group profile generated as a result of executing subprocess 432 is tagged with an identifier of the user. In the embodiment illustrated, the tag associated with the group profile on the remote device may be the same tag as is associated with the group profile on the first user device. To achieve this result the user identifier may be a value received in a message sent by the first user device. However, it should be appreciated that it is not a requirement that the same user identifier be used by both the first user device and the remote device. Rather, any identifier that can be used on remote device to identify a message sent by a device while being operated by a user may be employed.

Regardless of the nature of the identifier associated with the group profile at block 434, the process may proceed to block 436. At block 436, the remote device may store the profile in connection with the user identifier. The manner in which the group profile is stored in not critical to the invention. However, the profile may be stored in non-volatile memory on the remote device or in any other suitable storage location.

FIG. 4 illustrates that the process 400 ends after the first user device completes subprocess 420 and the remote device completes subprocess 430. However, the devices may continue to operate, performing other processes. After process 400 completes, the first user device and the remote device may exchange wireless messages in accordance with the peer-to-peer protocol. Such exchange of messages may be performed according to known techniques or in any other suitable way.

Though not illustrated in FIG. 4, such an exchange of messages may continue until the connection between the first user device and the remote device is broken, thereby suspending communication between the devices that form the group. Such a suspension of communication may occur in any suitable way. For example, one or more of the devices may be powered off or one or more of the devices may be moved such that the separation between the devices is too great to support reliable wireless communications. Alternatively, express user input into one or both of the devices may end the connection. Though, because the devices have formed a persistent group, either or both of the devices may reestablish communication based on the persistent group profile, as described below.

Figure 5A:
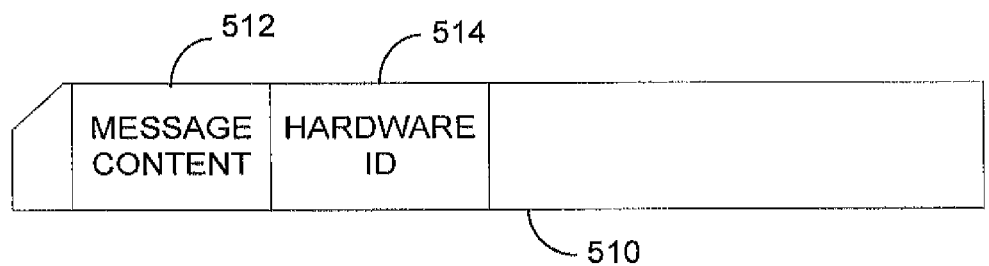
FIGS. 5A, 5B and 5C are exemplary messages that may be exchanged among devices forming a group according to some embodiments.
Figure 5B:
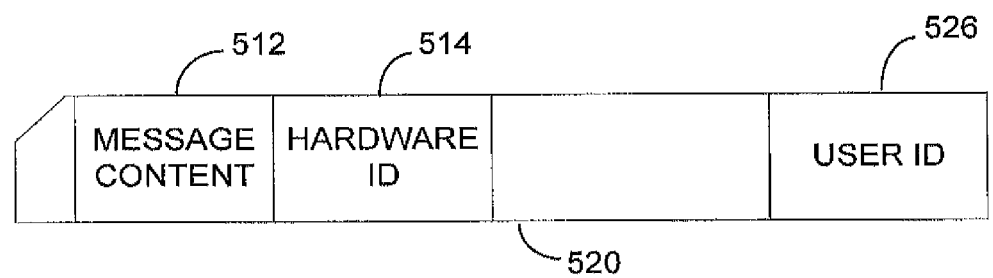
Figure 5C:
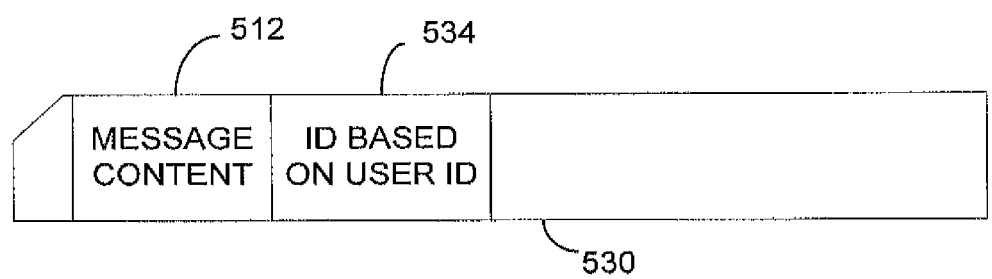

Process 400 entails the communication of messages, some or all of which may include a user identifier. FIGS. 5A, 5B, and 5C illustrate exemplary formats of messages that may be communicated according to process 400 or other processes in which formation of peer-to-peer groups may depend on a user of a device in the group.

FIG. 5A is a schematic illustration of a message 510 that may be formatted according to a peer-to-peer protocol as is known in the art. Such a message may include one or more fields containing various types of information. In this example, two such fields are illustrated for simplicity. Though, it should be appreciated that a message may include any suitable number of fields containing any suitable types of information.

In this example, a field 512 may include message content. In embodiments in which message 510 represents an action frame, field 512 may contain a code signifying a specific action. In other embodiments, message 510 may represent a data message. Accordingly, field 512 may contain data being communicated between devices. Though, the specific type of content contained in field 512 is not critical to the invention.

Message 510 also includes an identifier field 514. Identifier field 514 may include an identifier for the device transmitting the message 510. In this example, the identifier is generated based on a globally unique hardware identifier of the device sending message 510. Such a globally unique hardware identifier may act as a device address for the device in accordance with a peer-to-peer protocol. It may be a MAC address as described above in connection with FIG. 3, for example.

Regardless of the source of the identifier in field 514, in accordance with some peer-to-peer protocols, the identifier in field 514 may be used to identify a persistent group. As a specific example, in accordance with the Wi-Fi Direct protocol, a hardware identifier of a device selected as a group owner is used by all devices in a group as an identifier for the group. Accordingly, when message 510 represents a message transmitted by a group owner in a persistent peer-to-peer group, that hardware identifier will be used by devices in the group to both establish the group and reestablish the group at a later time. Specifically, in a conventional implementation of a persistent group, a device that has joined a persistent group identified by a particular hardware identifier will, if it subsequently receives a message identified with the same hardware identifier, attempt to reform a group based on a persistent group profile it has stored in association with such a hardware identifier.

FIG. 5B illustrates a message 520 that may be used instead of or in addition to a message 510 in embodiments in which persistent groups are associated with users. In this example, message 520 contains fields 512 and 514 similar to message 510. Additionally, message 520 includes a field 526 that contains information from which a user may be identified. In this example, field 526 contains an identifier of a current user of a device that transmitted message 520. Such a message, for example, could be sent at block 412 (FIG. 4). Devices that receive such a message may use a value in field 526 to identify a user of a device. In the example of FIG. 4, processing at block 434 may entail tagging a group profile base on the value in field 526.

Field 526 may be incorporated into message 520 in any suitable way. In some embodiments, field 526 may be incorporated as an information element in message 520. An information element may be a code or other unit of information inserted in a portion of a message that is formatted in accordance with a protocol. The protocol does not specify the format or content of the information element, but may specify that devices operating according to the protocol accept messages that include information elements.

Though, it should be appreciated that a user identifier need not be incorporated in to a message as an information element or other additional field in a message formatted according to a peer-to-peer protocol. In some embodiments, the user identifier may occupy the place of other information in the message. FIG. 5C illustrates such a message 530.

Message 530 has the same format as message 510. It includes, for example, field 512 containing message content. Message 530 also includes a field 534 in the place of field 514. In this example, rather than containing a hardware identifier, field 534 contains a value based on a user identifier. In this way, a device programmed to recognize a known device based on a hardware identifier, even if that device is not modified to process a user identifier, may identify a device based on its user. Such a message may be used in connection with some embodiments such as the embodiment described below in connection with FIGS. 7 and 8.

Figure 6:
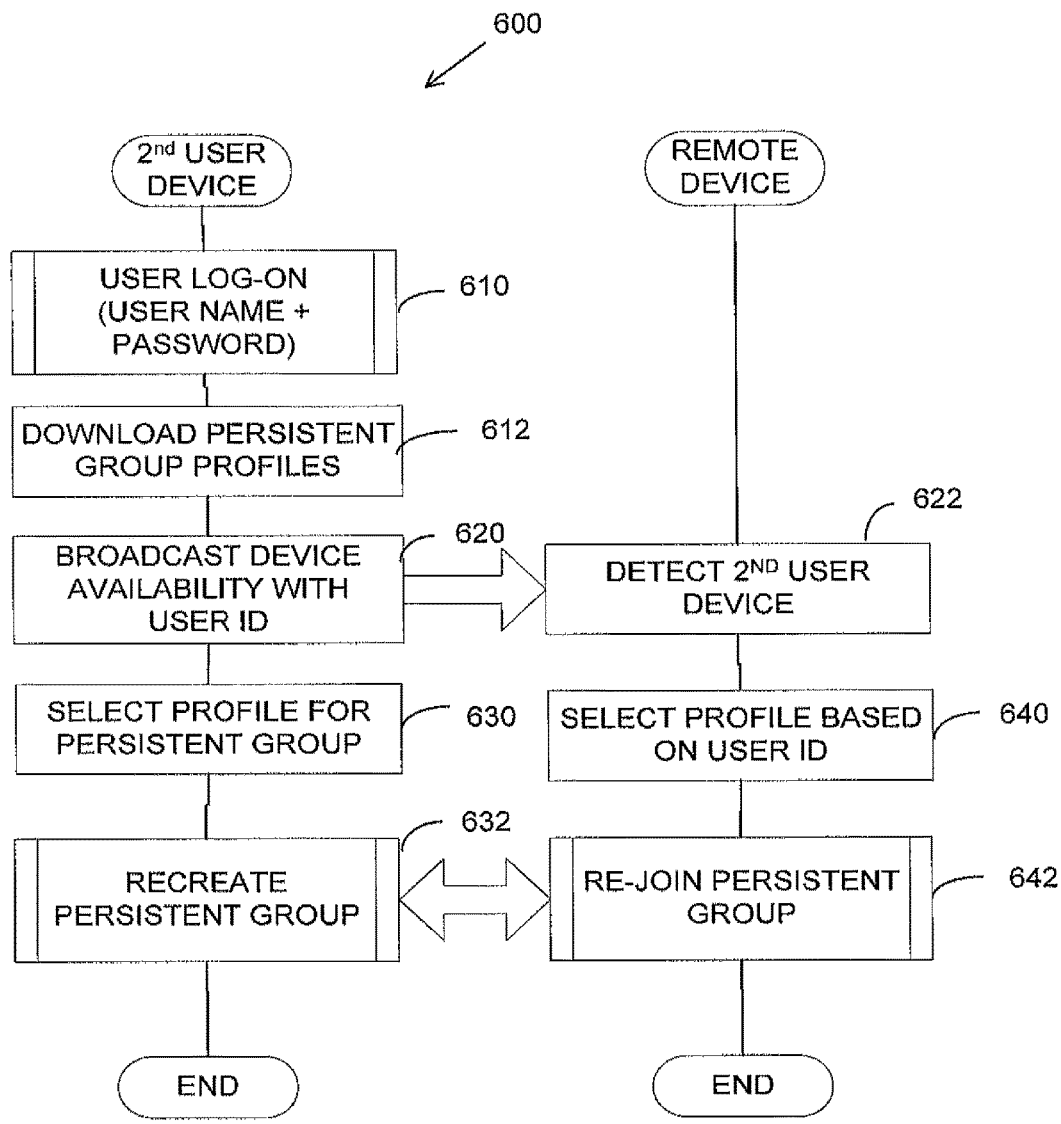
FIG. 6 is a flowchart of an exemplary method of operation of devices forming a peer-to-peer group based on a previously created profile for a persistent group.

Regardless of the format of messages used to convey a user identification, those messages may be used to identify devices that are intended to connect based on a previously established peer-to-peer group. FIG. 6 illustrates a process 600 in which a remote device that previously joined a persistent peer-to-peer group with a first user device forms a peer-to-peer group with a second user device based on the persistent group profile created for the first user device. In this example, the group profile is selected based on an indication that the second user device is being operated by the same user as the first user device.

As illustrated, the process 600 begins at subprocess 610, which is executed on the second user device. Subprocess 610 may entail the user logging on to the second user device. Accordingly, subprocess 610 may entail the same processing as described above in connection with block 410. Though, process 600 may include any suitable processing that results in the second user device obtaining information concerning that user.

At block 612, the second user device may use information about the user to access persistent group profiles for groups previously established by one or more devices when previously operated by the user. Processing at block 612 may entail accessing the location or locations where persistent group profiles were stored at block 426 (FIG. 4). For example, processing at block 612 may entail accessing a server 140 (FIGS. 1A and 1B) based on user log-on information acquired through subprocess 610.

Regardless of the specific locations from which the persistent group profiles are obtained, the second user device may be configured to establish a peer-to-peer group with devices identified in any such persistent group profile. Such processing may entail exchanging communications in accordance with a peer-to-peer protocol that supports persistent groups. Though, it should be appreciated that the group profiles obtained at block 612 may be used in any suitable way to establish communication with one or more devices that constitute a group as defined in a profile.

In this example, the second user device begins the process of forming a group by broadcasting its availability to participate in a group. Accordingly, the process 600 may proceed to block 620 where the second user device may broadcast its availability. That broadcast may include an identifier of the user of the second user device. In this example, the identifier will reveal that the second user device is being operated by the same user as the first user device during the processing of FIG. 4, even though that user is operating a different user device. The processing at block 612 may be performed in the same way as processing at block 412 (FIG. 4), but it should be appreciated that any suitable processing may be used by the second user device.

A remote device may detect the second user device based on such a broadcast. Accordingly, the process 600 includes block 622 performed by the remote device. In this example, the remote device performing portions of processing 600 may be the same remote device that performed portions of process 400 (FIG. 4).

Accordingly, the remote device may have access to a persistent group profile stored at block 436 (FIG. 4). At block 640, the remote device may search its profile store to identify a persistent group profile associated with the user identifier sent at block 620. Because the remote device has stored at block 436 (FIG. 4) a group profile identified with the same user identifier, at block 640 that persistent group profile may be selected. Despite the fact that the persistent group profile stored at block 436 was stored based on interactions with a first user device and process 600 is performed based on communications with a second user device, a persistent group profile stored at block 436 may nonetheless be selected because both the first user device and the second user device transmit messages containing the same user identifier.

At block 630, the second user device may similarly access a persistent group profile. The second user device may execute subprocess 632 and the remote device may execute subprocess 642. During subprocesses 632 and 642, the second user device and the remote device may exchange messages to establish a group according to the peer-to-peer protocol. The second user device may operate as a Group Owner and re-create the persistent group formed in process 400 through subprocess 632. The remote device may rejoin that persistent group in subprocess 642. The acts performed by the second user device in subprocess 632 and the remote device in subprocess 642 may be performed in accordance with a portion of a peer-to-peer protocol that prescribes reforming persistent groups based on a previously created persistent group profile. Though, in this example, rather than the devices selecting a persistent group profile based on a hardware identifier for the second user device, which is acting as the group owner, the persistent group profile used in forming the group is selected based on an identifier for the current user of the second user device.

As a result, a persistent group profile created when the same user was operating the first user device in process 400 (FIG. 4) can be used to re-create the persistent group. In this way, though the second user device never had previously paired with the remote device, migrating the persistent group profiles to the second user device, such as occurred at block 612, and accessing such profiles based on a user identifier allows the second user device and the remote device to form a connection without performing a pairing ceremony. As a result, subprocesses 632 and 642, resulting in a pairing of the second user device and the remote device, can be performed automatically such that the user of the second user device is not required to provide input to the second user device to initiate that pairing.

It should be appreciated that, though FIG. 6 shows a second user device forming a connection with a remote device, any number of user devices may form a connection with that remote device based on the persistent group profile stored by a user identifier. Any user device that has access to the persistent group profile information and can generate the user identifier used by the remote device to select a persistent group profile may pair with the remote device. Similarly, any number of remote devices may pair with a user device based on a previously created persistent group profile if the remote devices have access to such a profile and a mechanism to associate that profile with a device being operated by a user for whom that profile was created.

Figure 7:
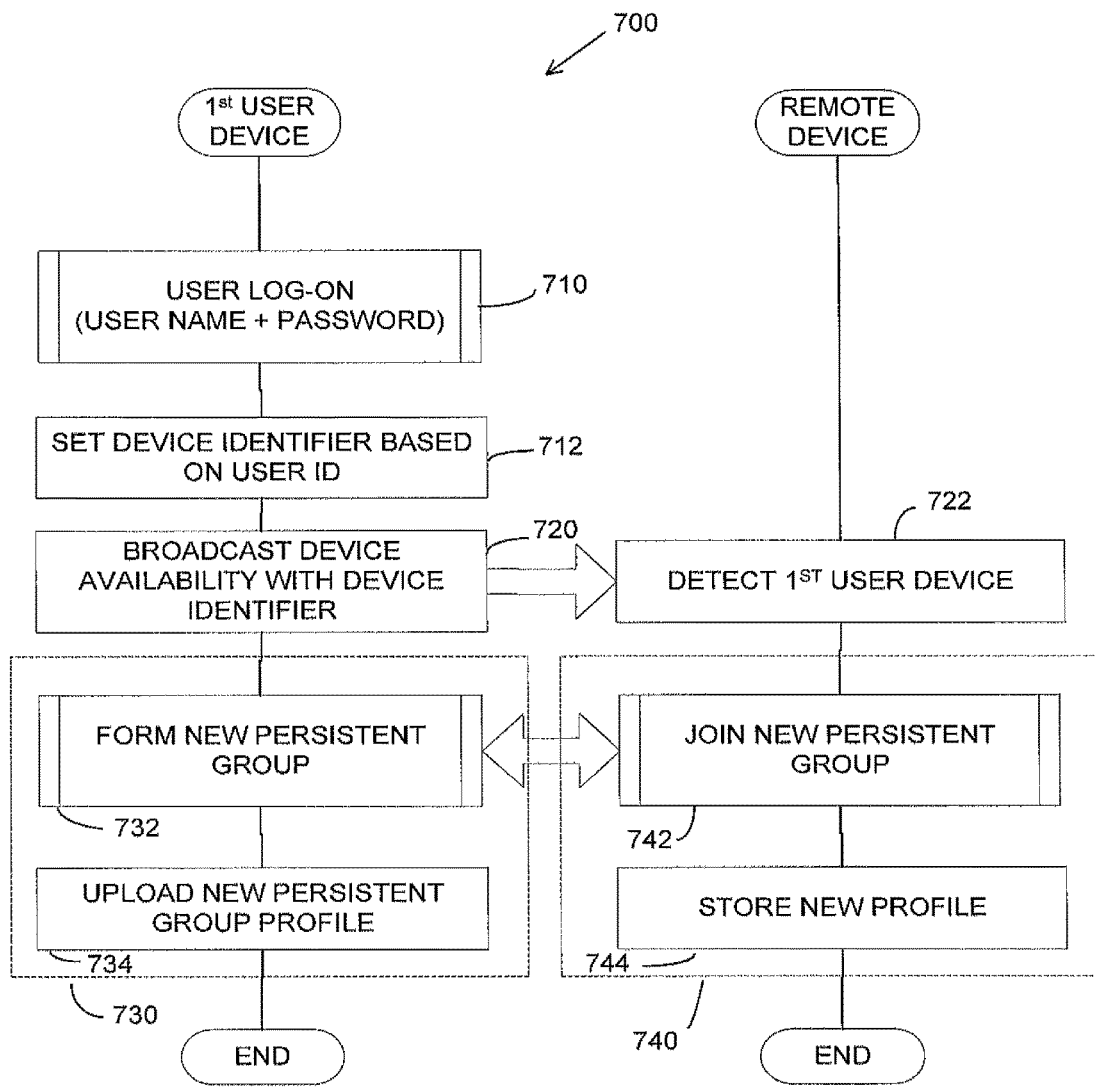
FIG. 7 is a flowchart of an exemplary method of operation of devices forming a peer-to-peer group according to some alternate embodiments.
Figure 8:
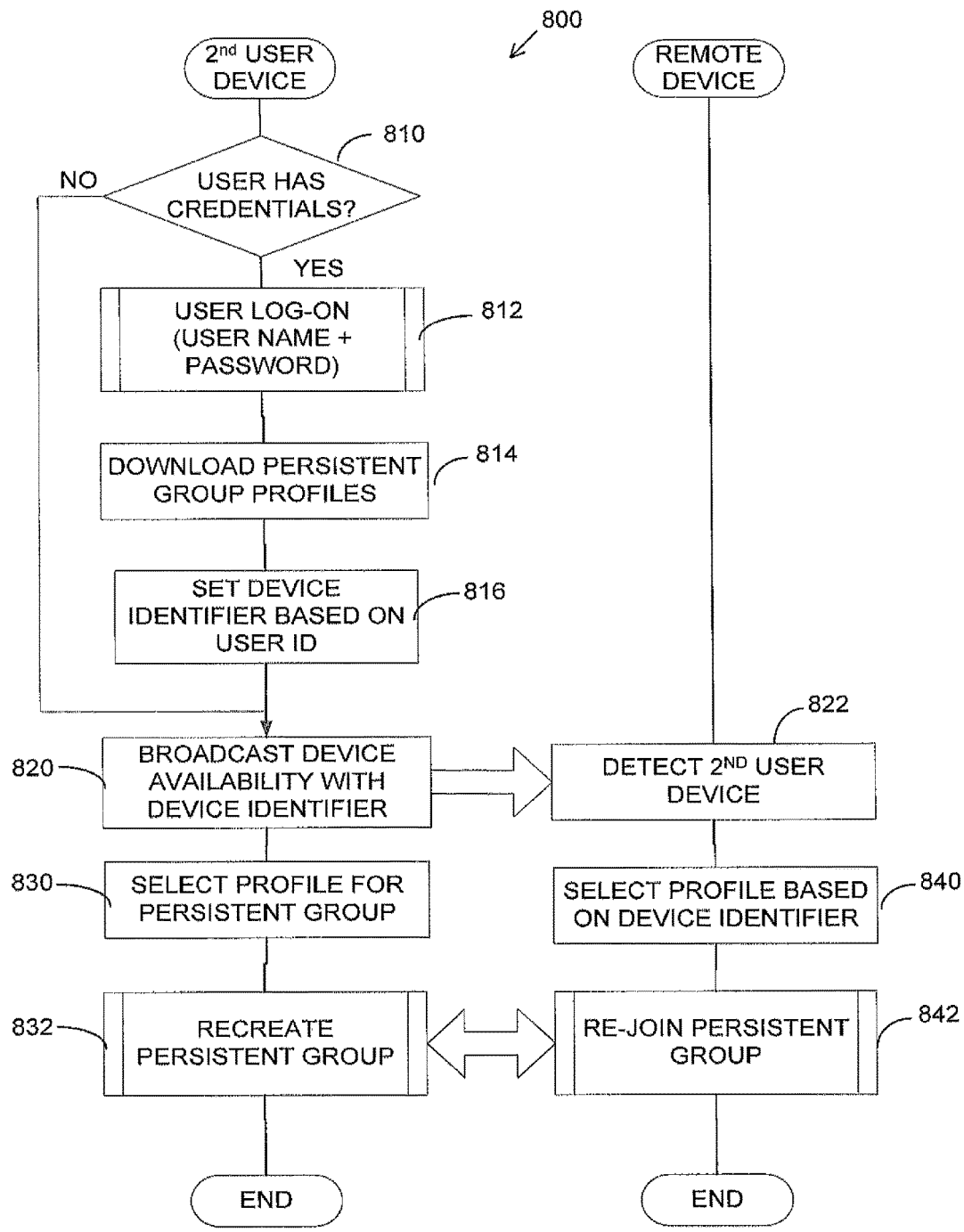
FIG. 8 is a flowchart of a method of forming a peer-to-peer group based on a previously created profile for a persistent group according to some alternate embodiments.

In the processes illustrated in FIGS. 4 and 6, the remote device may be configured to identify and process a user identifier. In this way, the user identifier becomes associated with a persistent group profile applicable to a device operated by a specific user. In some embodiments, the remote device is configured to perform actions of identifying and processing a parameter that specifically serves as a user identifier that do not occur in accordance with a conventional peer-to-peer protocol. It may be desirable in some cases for user specific persistent groups to include remote devices that have not been specifically configured to support user based persistent groups. FIGS. 7 and 8 illustrate an embodiment in which persistent peer-to-peer groups may be associated with specific users, rather than devices that may include remote devices that have not been specifically configured for user based persistent groups.

FIG. 7 illustrates an alternative embodiment of a process of forming a persistent group that may be accessible to a user regardless of a device operated by the user. FIG. 7 illustrates a process 700 that is performed by a first user device and a remote device. The process 700 begins at subprocess 710. At subprocess 710, the user may log-on to the first user device. Subprocess 710 may be performed in the same way as subprocess 410. Though, any suitable log-on mechanism may be used.

Process 700 may continue to block 712. At block 712, a device identifier may be set based on a user identifier obtained through subprocess 710. The user identifier may be generated in any suitable way, including as described above in connection with block 412. Though, rather than inserting the user identifier in a message, such as is illustrated in field 526 (FIG. 5B), the user identifier generated at block 712 may be used to replace a device identifier obtained based on the hardware of the first user device. For example, functional modules 394C, 394D and 394E may be configured to insert into messages transmitted by computing 310 (FIG. 3) identifiers based on values obtained from a hardware component of computing device 310. At block 712, the values read from the hardware components may be replaced by the user identifier generated at block 712. Accordingly, whenever functional modules 394C, 394D or 394E transmits a message with an identifier, the message will contain the user identifier rather than the hardware identifier. Such a message may be in the format of message 530 (FIG. 5C) or any other suitable format.

Accordingly, as the process proceeds to block 720, the first user device will broadcast its availability with an identifier set based on the user identifier at block 712.

At block 722, the remote device may detect the first user device based on the message sent at block 720. In this example, the message sent at block 720, having the form of message 530, is in the same form as a conventional message 510. Messages 510 and 530 differ only in the value in the identifier field. Accordingly, processing at block 722 may entail actions as are used to respond to a conventional message. Those actions may include execution of subprocess 740 in which the remote device joins a persistent group formed by the first user device. That group may be formed by the first user device executing subprocess 730. Accordingly, within subprocess 730, the first user device may perform subprocess 732 by exchanging messages with the remote device. Those messages may be formatted in accordance with a peer-to-peer protocol that supports forming persistent groups. The messages may be in the format of conventional messages used to form a persistent peer-to-peer group, except, as illustrated by FIG. 5C, the hardware identifier in the messages, rather than identifying the first user device, will have a value based on the user identifier set at block 712.

Within subprocess 740, the remote device may exchange messages with the first user device to join the persistent group. The messages exchanged within subprocess 742 may similarly be as in a conventional protocol for forming a persistent peer-to-peer group. Though, in this example, the remote device identifies the persistent group based on a value included in the hardware identifier field of messages transmitted by the first user device, which in this example is operating as the group owner. As a result, the remote device will store an identifier for the persistent group that is associated with the user operating the first user device.

Accordingly, at block 744 where the remote device stores the persistent group profile, it is stored in association with the user identifier. Similarly, when the first user device stores the profile at block 734, the stored profile is also associated with the user identifier. In this example, storing the persistent group profile entails uploading the persistent group profile to an external device. Such processing may be performed using actions as described above in connection with block 426 (FIG. 4). Though, such processing may be performed in any suitable way.

The stored profile may be associated with the user by storing the user identifier as a tag or other value that is part of the profile. Though, storing the profile at block 734 may alternatively or additionally entail associating the profile with the user of the first user device in any other suitable way.

Once the group has been established and profiles for the group stored, process 700 may end. Though not expressly illustrated in FIG. 7, other processes may be performed after process 700 ends. For example, the first user device and the remote device may continue to communicate, exchanging messages as part of the persistent group. Such communications may continue until the persistent group is suspended. Once the group is suspended, either or both of the devices may later re-form the group based on the persistent group profile information to which they have access.

FIG. 8 illustrates that the remote device, at a later time, may establish a connection with a second user device operated by the same user. Though, in this example, group formation may be contingent on the user providing the same credentials provided to the first user device during execution of process 700. Process 800 begins with decision block 810 executed by the second user device. At decision block 810, the process branches, depending on whether the user presents credentials to the second user device. If so, process 800 may proceed to subprocess 812. At subprocess 812, the second user device may receive those user credentials and complete a log-on process. Subprocess 812 may entail processing as described above in connection with subprocess 412. Though, any suitable log-on process may be performed.

Once the user has logged on, processing may proceed to block 814. At block 814, the second user device may download persistent group profiles associated with the user based on the supplied credentials. Processing at block 814 may entail the same steps as processing at block 612. Though, it should be appreciated that persistent group profiles may be downloaded at block 814 in any suitable way.

In the embodiment illustrated in FIG. 8, the second user device may format messages as in FIG. 5C in which a hardware identifier is replaced by a user identifier. Processing at block 816 may be performed as described above in connection with block 712. Though, such processing may be performed at any suitable way.

Processing may then proceed to block 820 where the second user device may broadcast its availability for forming a group. In scenarios in which processing reaches block 820 by passing through block 816, such messages will include a device identifier set based on the user identifier at block 816. However, in scenarios in which a user did not present credentials, the process 800 may branch from decision block 810 to block 820 without performing processing at block 816. In that scenario, messages broadcast at block 820 may include a device identifier set based on the hardware of second user device rather than the user identifier.

Regardless of the value of the identifier included in the messages sent at block 820, the remote device may receive such messages at block 822, allowing it to detect the second user device.

At block 840, the remote device may select a profile based on whatever identifier was included in the messages sent at block 820. In embodiments in which the identifier is set based on the user identifier, the selection at block 840 may select a previously created persistent group profile associated with the current user of the second user device. Conversely, if the messages sent at block 820 contain an identifier set based on the hardware of second user device, the remote device may select a persistent group profile based on the hardware identifier. Though, regardless of the specific profile selected, process 800 may proceed to subprocess 842 where the remote device uses that persistent group profile to rejoin the persistent group.

Similarly, at block 830, the second user device may select a profile for a persistent group. Such a selection may also be based on whether a user has provided credentials. If so, the selection made at block 830 may be from among persistent group profiles downloaded at block 814 based on the user credentials. When persistent group profiles are not downloaded at block 814, the selection may be from among persistent group profiles stored on the second user device.

Regardless of the specific persistent group profile selected at block 830, the process may proceed to subprocess 832. At subprocess 832, the second user device may exchange messages with the remote device to re-create a persistent group based on the selected profile. Subprocesses 832 and 842 may be performed using techniques as are known in the art for a device operating according to a peer-to-peer protocol that supports persistent groups. Though, in scenarios in which the device identifier is set at block 816 based on a user identifier, messages sent in subprocess 832 may include the user identifier rather than a hardware identifier.

As can be seen in the example of FIG. 8, the user device may be configured to operate in accordance with persistent group profiles established for a user rather than a specific device. In an embodiment in which the user identifier, when applicable, replaces a hardware identifier, the remote device does not require any special configuration to support user based persistent groups.

Figure 9:
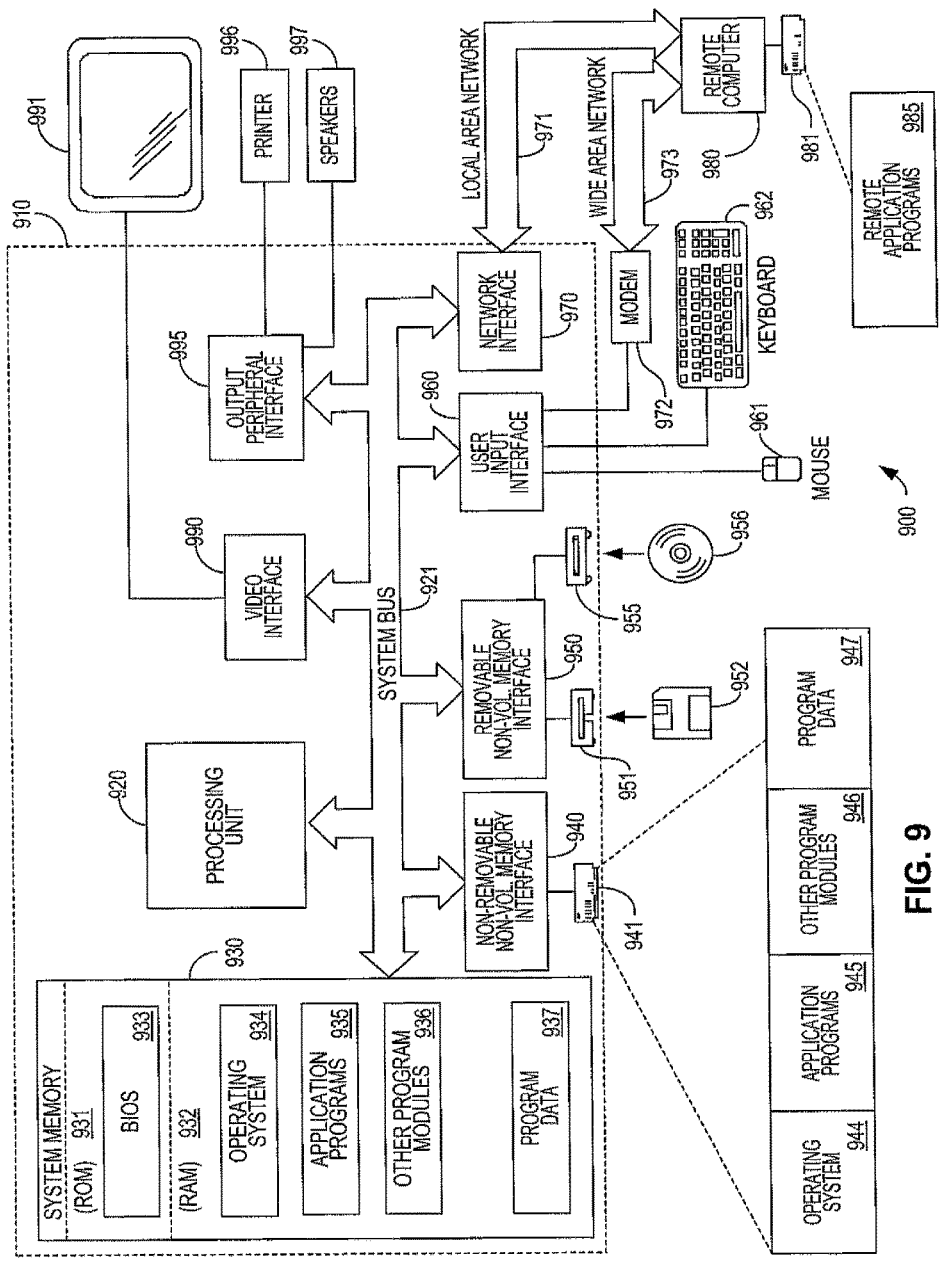
FIG. 9 is a sketch of an illustrative computing device in which some embodiments of the invention may be practiced.

As can be seen from the foregoing, any suitable technique or techniques may be employed to support migration of persistent group profiles from a first user device operated by a user to a second user device operated by the same user. Similarly, any suitable technique may be used to communicate from the user device to one or more remote devices which user is operating that device. Regardless of the specific techniques used, a user of any suitably equipped user device may encounter the same computing environment as regards connected wireless devices without expressly controlling any of the user devices to form those connections once the user has specified that a persistent group should be formed. These operations may be performed on any user device operated by the user that is configured according to the techniques described herein. FIG. 9 illustrates an example of such a user device. Though FIG. 9 can also be taken as an example of a remote device.

FIG. 9 illustrates an example of a suitable computing system environment 900 on which the invention may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, embodiments were described in which all members of a group store a persistent group profile and then retrieve that profile to reform a group. In other embodiments, only a subset of devices in a group may have a group profile. As a specific example, a client device in the group may store a group profile that identifies a group owner, but that group owner may not store a profile.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:
   using a user identifier used on a first wireless device to download from a networked computer device to a second wireless device a persistent group profile set describing a peer-to-peer connection set for the first wireless device upon receipt of a user identifier from a user on the second wireless device, the user identifier comprising user credentials of a user of the first wireless device and entered by the user of the first wireless device;
   broadcasting from the second wireless device a probe message having the user identifier indicating an availability of the second wireless device;
   selecting, without user input, using the second wireless device a persistent group profile from the persistent group profile set describing a peer-to-peer connection between the first wireless device and a remote device, the persistent group profile comprising information generated by the first wireless device to pair the first wireless device with the remote device, the information copied to the second wireless device as part of the downloading of the persistent group profile set from the networked computer device, the remote device being a peripheral device capable of pairing with the first and second wireless devices; and
   connecting automatically the second wireless device peer-to-peer with the remote device according to the persistent group profile resulting in creating a persistent group by pairing the second wireless device with the remote device.

2. The method of claim 1, wherein the persistent group profile represents wireless devices with which the remote device has previously paired and being migrated between the first and second wireless devices operated by the user and further comprising:
   transmitting the persistent group profile over a network for storage on the networked computing; and
   automatically recognizing at a later time any other wireless device operated by the user and automatically connecting the other wireless device to the remote device without performing a pairing ceremony by automatically translating device connections from the first wireless device or the second wireless device to the other wireless device.

3. The method of claim 2, further comprising:
   setting a device identifier based on the user identifier by replacing the device identifier with the user identifier in the probe message, wherein the first and second wireless devices are portable computing devices, wherein the user identifier is stored with the persistent group profile and used to automatically select and apply the persistent group profile when subsequent communications tagged with the user identifier are detected.

4. The method of claim 2, further comprising:
   including the user identifier with a device identifier in the probe message, wherein the second wireless device has never previously connected with the remote device.

5. The method of claim 1, wherein the persistent group profile comprises at least a PIN associated with the remote device, wherein the peripheral device comprises one of a camera, a printer, a keyboard or a mouse, and the user credentials comprise a user name and a password input by the user of the first wireless device, the user credentials associating the persistent group profile with the user and used to generate information for pairing the second wireless device with the remote device.

6. The method of claim 1, wherein the networked computing device is a server operated by a service associated with a user credential and upon the first wireless device being paired with the remote device, further comprising storing in the networked computer device the persistent group profile generated by the first wireless device used to pair the first wireless device with the remote device, and wherein connecting automatically comprises automatically reestablishing on the second wireless device a peer-to-peer group defined by the persistent group profile set.

7. The method of claim 6, wherein: re-establishing the peer-to-peer group comprises, with the second wireless device associated with the user, communicating with the remote device.

8. The method of claim 7, further comprising:
   transmitting the persistent group profile over a network for storage on the networked computing device; and
   retrieving the persistent group profile based on the user identifier comprises using the user identifier as a credential to access the networked computing device.

9. A method comprising:
   receiving a credential from a user in a first wireless device identified by a hardware identifier that includes a hardware address for the first wireless device;
   determining with the first wireless device an identifier based on the credential; and
   wirelessly communicating between the first wireless device and a remote device to form a peer-to-peer group comprising at least the remote device and the first wireless device, the wirelessly communicating comprising transmitting at least one message for forming the peer-to-peer group, each message of the at least one message using the determined identifier in place of the hardware identifier having the hardware address, wherein a persistent group profile describes a peer-to-peer connection for the peer-to-peer group, the persistent group profile comprising information generated by the first wireless device to pair the first wireless device with the remote device, the information copied to a second wireless device as part of a downloading of the persistent group profile from the user computing device.

10. The method of claim 9, further comprising, with the second wireless device: wirelessly communicating with the remote device to form the peer-to-peer group comprising at least the remote device and the second device, the wirelessly communicating comprising transmitting at least one message for forming the peer-to-peer group, each message of the at least one message containing, in a portion of the message, the determined identifier of the first wireless device.

11. The method of claim 9, wherein: the peer-to-peer group is formed in accordance with a protocol that supports re-forming groups based on the persistent group profile; and the wirelessly communicating, with the second wireless device, comprises communicating messages to re-form the peer-to-peer group in accordance with the protocol.

12. The method of claim 11, further comprising: with the second wireless device: receiving user input providing the identifier of the user; and selecting the persistent group profile for use in formatting the portion of at least one message in accordance with the protocol, the persistent group profile comprising the determined identifier of the first wireless device.

13. The method of claim 9, wherein: transmitting at least one message for forming the peer-to-peer group comprises transmitting messages in accordance with Wi-Fi Direct protocol.

14. The method of claim 9, wherein: a portion of the message comprises a field providing an identifier of the group and the hardware address is a media access control (MAC) address.

15. A computing device comprising:
a wireless transceiver;
at least one processor configured to:
control the wireless transceiver to exchange messages in accordance with a peer-to-peer protocol, the messages comprising at least one portion identifying a group of devices formed in accordance with the protocol; and
select a value for the at least one portion based on at least one of a user identifier and a hardware identifier of the computing device, the hardware identifier including a hardware address for a first wireless device; and
a computer storage media configured to:
associate the user identifier with a persistent group profile for the peer-to-peer group describing a peer-to-peer connection with a remote device upon receipt of a user identifier from a user on a second wireless device, the user identifier comprising user credentials of a user of the first wireless device and entered by the user of the first wireless device, the user identifier replacing the hardware identifier having the hardware address, the persistent group profile comprising information generated by the first wireless device to pair the first wireless device with the remote device, the information copied to a second wireless device as part of a downloading of the persistent group profile from the computing device; and
upload the persistent group profile to a networked computing device tagged with the user identifier to be made accessible to other devices for connecting peer-to-peer with the remote device.

16. The computing device of claim 15, wherein the hardware identifier comprises a MAC address of the transceiver.

17. The computing device of claim 16, wherein the user identifier comprises a user credential input by the user including a user name and password.

18. The computing device of claim 15, wherein the messages in accordance with the peer-to-peer protocol comprise messages for re-forming the peer-to-peer group based on the persistent group profile in the profile store.

19. The computing device of claim 15, wherein: the messages in accordance with the peer-to-peer protocol comprise messages for forming the peer-to-peer group, the peer-to-peer group being identified based on an identifier of the computing device, and further comprising accessing information in a persistent device store to identify specific devices and send commands to generate action frames to establish a wireless connection with the remote device identified in the persistent device store automatically in response to a user input.

20. The computing device of claim 15, wherein the wireless transceiver uses the user identifier for the downloading from a networked computing device of the persistent group profile for the group.

* * * * *